(12) United States Patent
Kikata et al.

(10) Patent No.: US 10,379,523 B2
(45) Date of Patent: Aug. 13, 2019

(54) MACHINING PROGRAM EDITING ASSIST APPARATUS

(71) Applicant: Yamazaki Mazak Corporation, Niwa-gun (JP)

(72) Inventors: Kazuhiro Kikata, Niwa-gun (JP); Morikuni Kimura, Niwa-gun (JP); Takuro Katayama, Niwa-gun (JP); Shunsuke Koike, Niwa-gun (JP); Takayuki Ota, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 38 days.

(21) Appl. No.: 15/438,771

(22) Filed: Feb. 22, 2017

(65) Prior Publication Data
US 2017/0160724 A1 Jun. 8, 2017

Related U.S. Application Data

(63) Continuation of application No. PCT/JP2015/075137, filed on Sep. 3, 2015.

(30) Foreign Application Priority Data

Sep. 3, 2014 (JP) .................. 2014-179532

(51) Int. Cl.
*G05B 19/4068* (2006.01)
*G05B 19/409* (2006.01)
(Continued)

(52) U.S. Cl.
CPC ....... *G05B 19/4068* (2013.01); *B23Q 1/0045* (2013.01); *B23Q 15/00* (2013.01);
(Continued)

(58) Field of Classification Search
CPC .............. G05B 19/4068; G05B 19/409; G05B 2219/36041; G05B 2219/36071;
(Continued)

(56) References Cited

U.S. PATENT DOCUMENTS 4,794,514 A * 12/1988 Hideaki ........... G05B 19/40937
318/568.1
6,502,007 B1 * 12/2002 Kanamoto ....... G05B 19/40937
700/173
(Continued)

FOREIGN PATENT DOCUMENTS

CN 103576607 2/2014
EP 0519077 12/1992
(Continued)

OTHER PUBLICATIONS

CNC cookbook, CNC dictionary, Jun. 10, 2018, https://www.cnccookbook.com/cnc-dictionary-n-to-pwm/, pp. 1. (Year: 2018).*
(Continued)

*Primary Examiner* — Brian W Wathen
*Assistant Examiner* — Olvin Lopez Alvarez
(74) *Attorney, Agent, or Firm* — Mori & Ward, LLP

(57) ABSTRACT

A machining program editing assist apparatus includes a display controller. While the display objects are being displayed in either one of the program data display area and the process list display area, the display controller decides that a designated display object of the one of the display areas is the display object designated by the display objects of the one of the display areas and a specific point, differentiates the designated display object from the other display objects in the one of the display areas, decides that a designated display object of the other of the display areas is the display candidate of the other of the display areas, includes the designated display object in the display objects of the other
(Continued)

of the display areas, and differentiates the designated display object from the other display objects in the other of the display areas.

11 Claims, 31 Drawing Sheets

(51) Int. Cl.
    *B23Q 1/00*     (2006.01)
    *B23Q 15/00*     (2006.01)
    *B23Q 17/00*     (2006.01)
    *G05B 19/18*     (2006.01)

(52) U.S. Cl.
    CPC .............. *B23Q 17/00* (2013.01); *G05B 19/18* (2013.01); *G05B 19/409* (2013.01); *G05B 2219/35505* (2013.01); *G05B 2219/36041* (2013.01); *G05B 2219/36071* (2013.01); *G05B 2219/36172* (2013.01); *G05B 2219/36177* (2013.01); *Y02P 90/265* (2015.11)

(58) Field of Classification Search
    CPC ...... G05B 19/18; B23Q 1/0045; B23Q 15/00; B23Q 17/00; Y02P 90/265
    See application file for complete search history.

(56) References Cited

U.S. PATENT DOCUMENTS

| | | | |
|---|---|---|---|
| 8,606,391 B2* | 12/2013 | Beck | G05B 19/4068 700/159 |
| 8,989,891 B2* | 3/2015 | Matsumoto | G05B 19/4068 700/159 |
| 2006/0259181 A1* | 11/2006 | Kamiya | G05B 19/4093 700/180 |
| 2007/0250204 A1* | 10/2007 | Ould | G05B 19/401 700/181 |
| 2011/0015771 A1* | 1/2011 | Guo | G05B 19/4063 700/97 |
| 2013/0006391 A1* | 1/2013 | Kito | G05B 19/409 700/11 |
| 2013/0006396 A1* | 1/2013 | Kito | G05B 19/4093 700/83 |
| 2013/0125044 A1 | 5/2013 | Saylor et al. | |
| 2013/0138236 A1* | 5/2013 | Nagaoka | G05B 19/19 700/108 |
| 2014/0022086 A1 | 1/2014 | Tezuka et al. | |
| 2014/0172151 A1* | 6/2014 | Niwa | G05B 19/4068 700/186 |
| 2016/0011583 A1* | 1/2016 | Matsubara | G05B 19/4093 700/181 |
| 2017/0160725 A1* | 6/2017 | Kikata | G05B 19/4068 |

FOREIGN PATENT DOCUMENTS

| | | | | |
|---|---|---|---|---|
| EP | 2590039 | | 5/2013 | |
| JP | 05-158517 | | 6/1993 | |
| JP | 405158517 | * | 6/1993 | ............. G05B 19/18 |
| JP | 05-233054 | | 9/1993 | |
| JP | 05-297925 | | 11/1993 | |
| JP | 09-062326 | | 3/1997 | |
| JP | 202132313 | * | 5/2002 | ......... G05B 19/4093 |
| WO | WO 92/12472 | | 7/1992 | |
| WO | WO2016035869 | * | 3/2016 | ............. B23Q 15/00 |

OTHER PUBLICATIONS

International Preliminary Report on Patentability (Chapter I) with translation of Written Opinion of the International Searching Authority for corresponding International Application No. PCT/JP2015/075137, dated Mar. 16, 2017, pp. 9.
International Search Report for corresponding International Application No. PCT/JP2015/075137, dated Nov. 10, 2015, pp. 3.
Chinese Office Action for corresponding CN Application No. 201580003827.0, dated Jan. 23, 2017, pp. 2.
Extended European Search Report for corresponding EP Application No. 15838128.5-1927, dated Sep. 13, 2017, pp. 8.

* cited by examiner

POINT MACHINING UNIT/
C-AXIS POINT MACHINING UNIT
- DRILL
- WASHER FACED HOLE
- TAP
⋮

LINE MACHINING UNIT/
C-AXIS LINE MACHINING UNIT
- LINE CENTER
⋮

FACE MACHINING UNIT
- FACE-MILL
- END-MILL FACE
⋮

TURNING UNIT
- BAR WORK
⋮

FIG. 5

| | | | | |
|---|---|---|---|---|
| UNo. 0 | COMMON: UNIT DATA | | | |
| UNo. 1 | FRM: UNIT DATA | | | |
| UNo. 2 | HEAD SELECTION: UNIT DATA | | | |
| UNo. 3 | INDEX: UNIT DATA | | | |
| UNo. 4 | BAR WORK: UNIT DATA | TOOL SEQUENCE DATA (SNo.) | SHAPE SEQUENCE DATA (FIG) | |
| UNo. 5 | INDEX: UNIT DATA | | | |
| UNo. 6 | BAR WORK: UNIT DATA | TOOL SEQUENCE DATA (SNo.) | SHAPE SEQUENCE DATA (FIG) | |
| UNo. 7 | INDEX: UNIT DATA | | | |
| UNo. 8 | FRM SHIFT: UNIT DATA | | | |
| UNo. 9 | FACING-MILL: UNIT DATA | TOOL SEQUENCE DATA (SNo.) | SHAPE SEQUENCE DATA (FIG) | |
| UNo. 10 | DRILL: UNIT DATA | TOOL SEQUENCE DATA (SNo.) | SHAPE SEQUENCE DATA (FIG) | |
| UNo. 11 | FRM SHIFT: UNIT DATA | | | |
| ... | | | | |
| File End | END: UNIT DATA | | | |

F I G. 6

| ○COMMON |
|---|
| 1 FRM-0 |
| 2 HEAD SELECTION |
| 3 INDEX |
| 4 BAR WORK |
| 5 INDEX |
| 6 BAR WORK |
| 7 INDEX |
| 8 FRM SHIFT |
| 9 FACING MILL |
| 10 DRILL |
| 11 FRM SHIFT |

| UNo. | MATERIAL | OUTER DIAMETER | INNER DIAMETER | MATERIAL LENGTH | MATERIAL END FACE | ATC MODE | RPM | OUTER DIAMETER OF LOWER BLADE |
|---|---|---|---|---|---|---|---|---|
| 0 | FC250 | 20. | 30. | 350. | 0. | 1 | 0. | 120. |

| UNo. | UNIT | ADDITIONAL FRM | | X | Y | Z | | | |
|---|---|---|---|---|---|---|---|---|---|
| 1 | FRM- | 0 | | TURNING CENTER | TURNING CENTER | 0. | | 0. | |

| UNo. | UNIT | PATTERN | | HEAD | SPINDLE |
|---|---|---|---|---|---|
| 2 | HEAD SELECTION | INDEPENDENT | | 1 | ◆ |

| UNo. | UNIT | ROTATING POSITION X | ROTATING POSITION Y | ROTATING POSITION Z | ANGLE B | ANGLE C |
|---|---|---|---|---|---|---|
| 3 | INDEX | | | | 90. | 0. |

| UNo. | UNIT | MACHINING PART | CUTTING-X | CUTTING-Z | FINISHING ALLOWANCE-X | FINISHING ALLOWANCE-Z |
|---|---|---|---|---|---|---|
| 4 | BAR WORK | OUTER DIAMETER | 120. | 0. | 0.1 | 0.1 |

FIG. 8

| UNo. | UNIT MACHINING PART | | | | CUTTING-X | CUTTING-Z | FINISHING ALLOWANCE-X | FINISHING ALLOWANCE-Z | | |
|---|---|---|---|---|---|---|---|---|---|---|
| 4 | BAR WORK | OUTER DIAMETER | | | 120. | 0. | 0.1 | 0.1 | | |

| SNo. | TOOL | NOMINAL | No. | PATTERN | CUTTING 1 | CUTTING 2/TIME | REMAINING CUTTING ALLOWANCE 3 | REMAINING ALLOWANCE-X | REMAINING ALLOWANCE-Z | SURFACE SPEED | FEED RATE |
|---|---|---|---|---|---|---|---|---|---|---|---|
| R 1 | TURNING | OUTER DIAMETER 25. | A | 0 | 2 | @ | @ | @ | 0. | 120 | 0.4 M |
| F 2 | TURNING | OUTER DIAMETER 25. | A | @ | @ | @ | @ | 0. | 0. | 196 | 0.1 M |

| FIG PTN | FRONT CORNER | START-X | START-Z | START-X | START-Z | REAR CORNER/$ | R/θ | | ROUGHNESS | M |
|---|---|---|---|---|---|---|---|---|---|---|
| 1 LINE | @ | @ | @ | @ | 67. | 32.5 | @ | | | |
| 2 LINES | @ | @ | @ | 100. | 85. | @ | | | | |
| 3 LINES | @ | @ | @ | 110. | 120. | @ | | | | |
| 4 TAPER | 110. | 120. | 80. | 150. | @ | | | | | |
| 5 LINES | @ | @ | @ | 80. | 350. | @ | | | | |

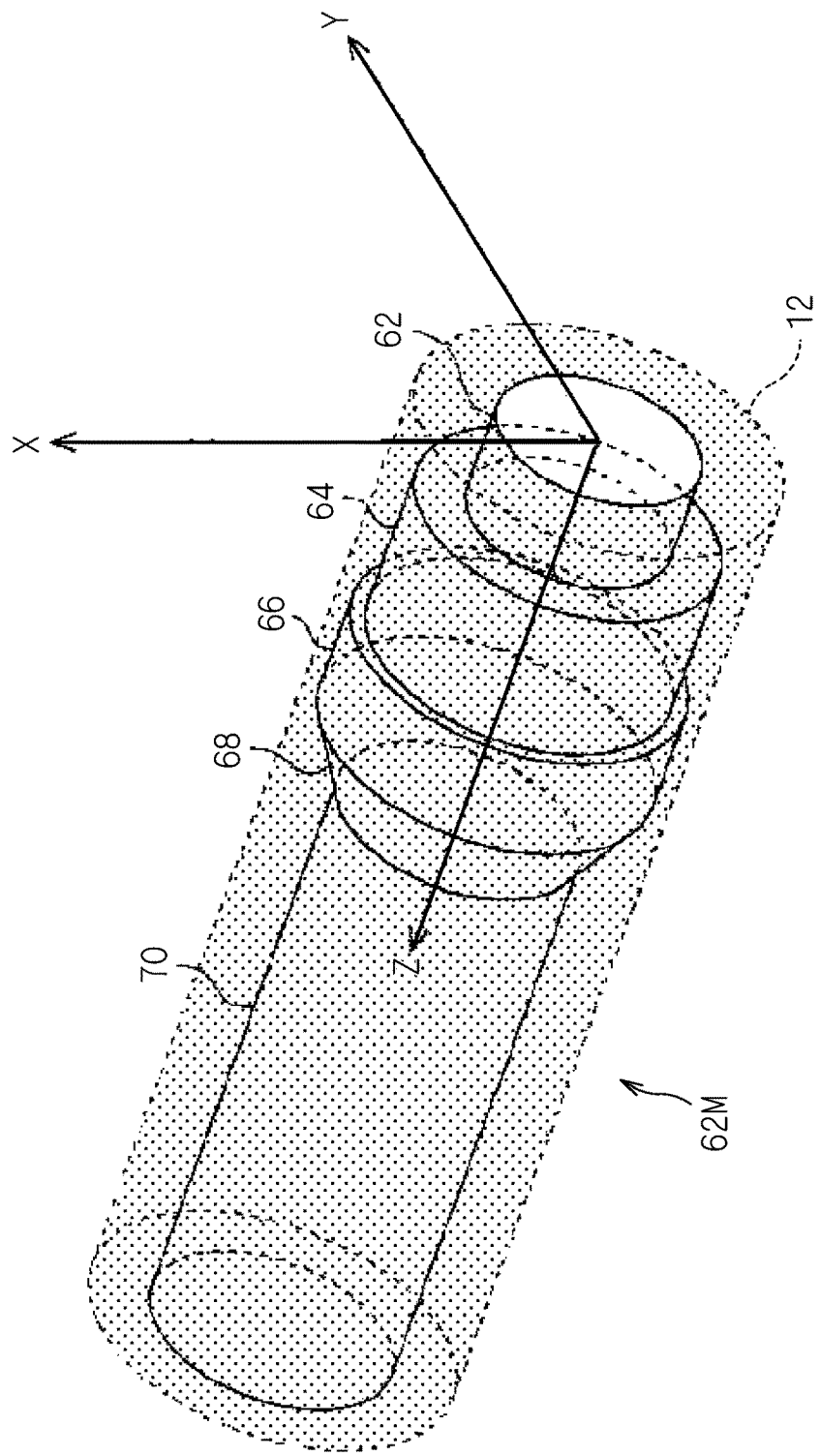

FIG. 10

| UNo. | UNIT | DEPTH | ALLOWANCE-Z | BOTTOM | FINISHING-ALLOWANCE-Z | | | | | |
|---|---|---|---|---|---|---|---|---|---|---|
| 9 | FACING-MILL | 15. | 15. | 3 | 0. | | | | | |

| SNo. | TOOL | NOMINAL DIAMETER | No. | APPROACH-X | APPROACH-Y | METHOD | ZFD | CUTTING-Z | CUTTING-R | SURFACE SPEED | FEED RATE | M | M | M |
|---|---|---|---|---|---|---|---|---|---|---|---|---|---|---|
| R1 | FACING-MILL | 30. | A | 40. | 60. | BIDIRECTIONAL CUT IN Y DIRECTION | ◆ | 5. | 25. | 57 | 0.843 | | | |

| FIG | PTN | X | Y | R/θ | I | J | P | CNR | R FEED | ROUGHNESS | | | |
|---|---|---|---|---|---|---|---|---|---|---|---|---|---|
| 1 | STRAIGHT LINE | 50. | 40. | | | | | | ◆ | ▼ | 3 | | |
| 2 | STRAIGHT LINE | 0. | 40. | | | | | | ◆ | ▼ | 3 | | |
| 3 | STRAIGHT LINE | 0. | -40. | | | | | | ◆ | ▼ | 3 | | |
| 4 | STRAIGHT LINE | 50. | -40. | | | | | | ◆ | ▼ | 3 | | |

| UNo | UNIT | | | | | | | | |
|---|---|---|---|---|---|---|---|---|---|
| 4 | BAR WORK | | | | | | | | |

| SNo | TOOL | MACHINING PART | NO-MINAL | No. | PATTERN | CUTTING-X | CUTTING-Z | FINISHING ALLOWANCE-X | FINISHING ALLOWANCE-Z |
|---|---|---|---|---|---|---|---|---|---|
| R 1 | TURNING | OUTER DIAMETER | 25. | A | 0 | 120. | 0. | 0.1 | 0.1 |
| F 2 | TURNING | OUTER DIAMETER | 25. | A | @ | @ | 4 | CUTTING 1 | CUTTING 2/TIME | CUTTING 3 |
| | | FRONT CORNER | | | | | | | |

| FIG | PTN | START-X | START-Z | END-X | END-Z | | | | REAR CORNER/$ |
|---|---|---|---|---|---|---|---|---|---|
| 1 | LINE | @ | @ | 67. | 32.5 | | | | |
| 2 | CONVEX | 95. | 32.5 | 100. | 35. | | | | |
| 3 | LINE | @ | @ | 100. | 85. | | | | |
| 4 | LINE | @ | @ | 100. | 120. | | | | |

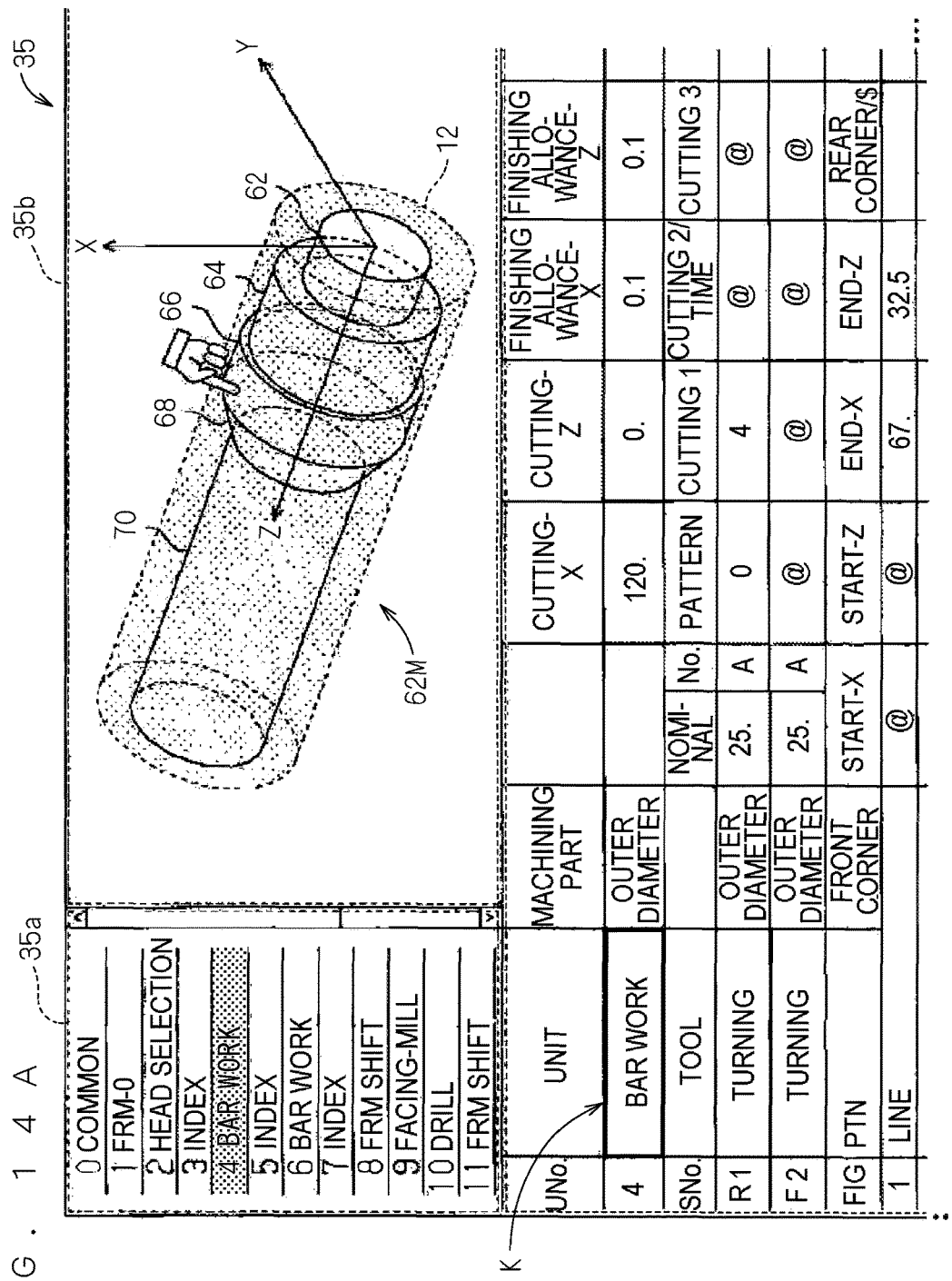

PROCESS INFORMATION TABLE

| No. | T CODE | ROW NUMBER |
|---|---|---|
| 1 | | |
| 2 | 1 | 4 |
| 3 | 3 | 6 |
| 4 | 7 | 32 |
| 5 | 15 | 33 |
| 6 | 27 | 322 |

FIG. 23

COORDINATE VALUE TABLE

| No. | PROGRAMM ROW NUMBER | G CODE | COORDINATE |
|---|---|---|---|
| | | | |
| | | | |
| | | | |
| ⋮ | ⋮ | ⋮ | ⋮ |

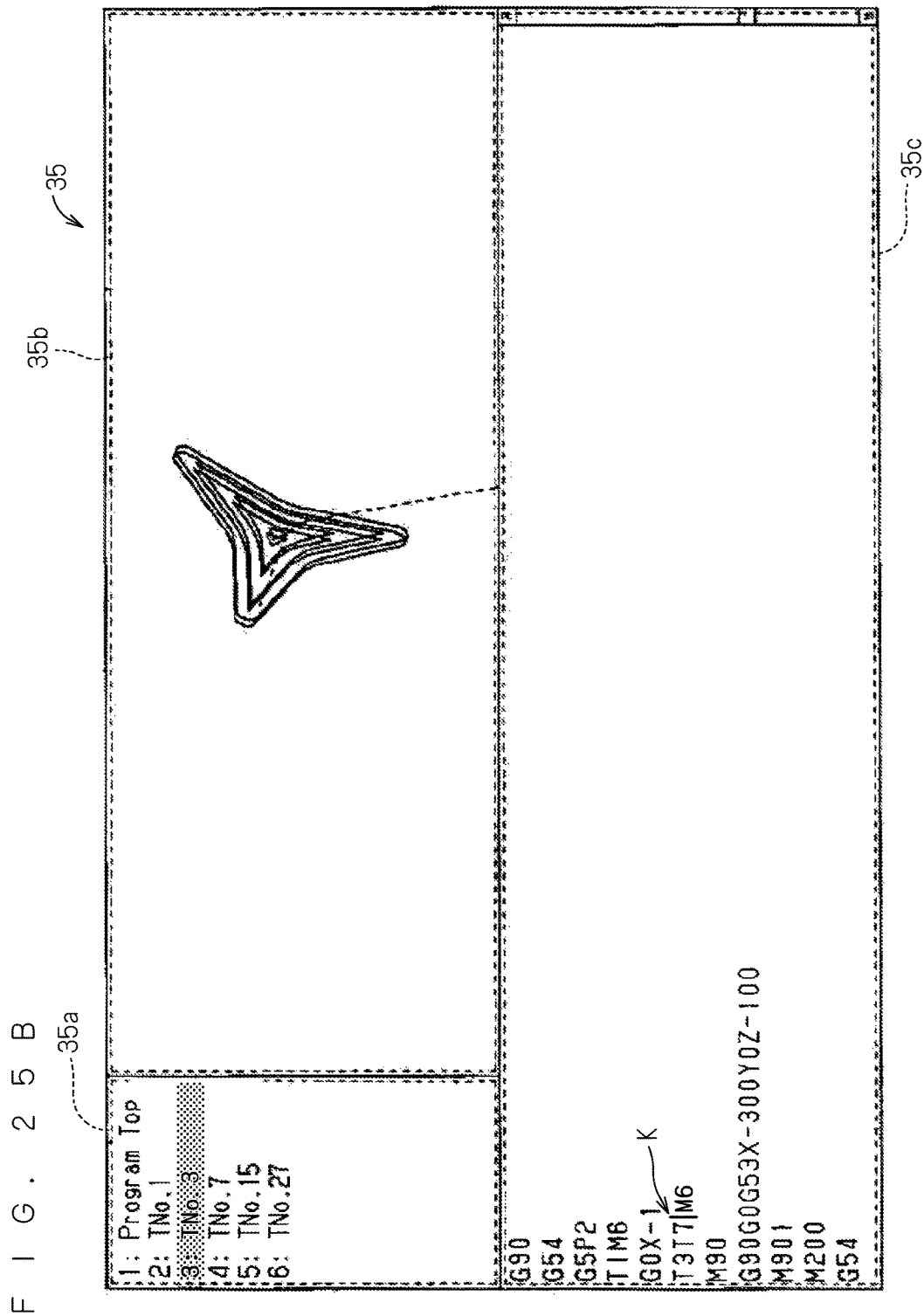

FIG. 29

```
T3M6 (T3 63DRILL SANDVIK)
G90G56G0

G91G28X0Z0
G90G54G0

G91G28X0Z0
G90G56G0

G91G28X0Z0
T7M6 (T07 40ENDMILL MITSUBISHI AJX)
G90G55G0

G91G28X0Z0
T5M6 (T05 63ENDMILL MITSUBISHI)
G90G55G0M50

G91G28X0
T19M6 (T19 V80MAZAK)
G90G57G0M50

G91G28X0Z0
T15M6 (T15 30.0DRILL SANDVIK)
G90G55G0

G91G28X0Z0
T7M6 (T07 40ENDMILL MITSUBISHI AJX)
G90G55G0M50

G91G28X0Z0
T11M6 (T11 20ENDMILL R2.5 SANDVIK)
G90G55G0M50

G91G28X0Z0
G56

G91G28X0Z0
G54

G91G28X0Z0
T1M6 (14.0DRILL OSG)
G90G55G0
```
↑ CC

PROCESS CODE = TOOL CHANGE COMMAND CODE

```
01  T-No.3
02  T-No.7
03  T-No.5
04  T-No.19
05  T-No.15
06  T-No.7
07  T-No.11
08  T-No.1
09  T-No.3
```

PROCESS CODE = TOOL CHANGE COMMAND CODE + COORDINATE SYSTEM DESIGNATION CODE

```
01  T-No.3
02  G56
03  G54
04  G56
05  T-No.7
06  G55
07  T-No.5
08  G55
09  T-No.19
10  G57
11  T-No.15
12  G55
13  T-No.7
14  G55
15  T-No.11
16  G55
17  G56
18  T-No.1
19  G55
20  T-No.3
21  G55
```

PROCESS CODE = COMMENT COMMAND CODE

```
01  (T3 63DRILL SANDVIK)
02  (T07 40ENDMILL MITSUBISHI AJX)
03  (T05 63ENDMILL MITSUBISHI)
04  (T19 V80MAZAK)
05  (T15 30.0DRILL SANDVIK)
06  (T07 40ENDMILL MITSUBISHI AJX)
07  (T11 20ENDMILL R2.5 SANDVIK)
08  (14.0DRILL OSG)
09  (T3 M16TAP)
```

MACHINING PROGRAM EDITING ASSIST APPARATUS

CROSS-REFERENCE TO RELATED APPLICATIONS

The present application is a continuation application of International Application No. PCT/JP2015/075137, filed Sep. 3, 2015, which claims priority to Japanese Patent Application No. 2014-179532, filed Sep. 3, 2014. The contents of these applications are incorporated herein by reference in their entirety.

BACKGROUND OF THE INVENTION

Field of the Invention

The present invention relates to a machining program editing assist apparatus.

Discussion of the Background

For example, in the Japanese Unexamined Patent Application Publication No. 05-158517, a technology concerning a controller described below is disclosed. The controller recognizes a separation between two continuous machining processes based on the process identification information added to the machining program for each machining process and controls the start and stop of running each machining process of the machining program, in order to perform re-machining of each machining process when the machining program is tested. Therefore, in particular, even when the machining program is long and it takes time to find the target machining process in the machining program, this function enables the operator to find the point to start re-machining, easily.

SUMMARY OF THE INVENTION

According to one aspect of the present invention, a machining program editing assist apparatus for assisting in editing a machining program of a machine tool, includes a display device, an input device, and a display controller. The input device indicates an arbitrary point on a screen of the display device. The display controller is configured to divide the screen into at least two display areas including a program data display area and a process list display area. The display controller is configured to display data in the display areas. The machining program has program data including data that include a separation of a machining process. The program data includes machining method data and shape definition data. The machining method data define the method of machining of each machining process. The shape definition data define the shape related to the machining of each machining process. The machining method data include process name data meaning the process name of the machining process correspondent to the machining method data. The display controller is configured to set the program data as display candidates of the program data display area. The display controller is configured to display at least a part of the program data as display objects in the program data display area. The display controller is configured to set the process name data as display candidates of the process list display area. The display controller is configured to display at least a part of the process name data as display objects in the process list display area. While the display objects are being displayed in either one of the program data display area and the process list display area, and when a specific point is indicated in the one of the display areas via the input device, the display controller is configured to decide that a designated display object of the one of the display areas is the display object designated by the display objects of the one of the display areas and the specific point, configured to differentiate the designated display object from the other display objects in the one of the display areas, configured to decide that a designated display object of the other of the display areas is the display candidate of the other of the display areas, which corresponds to the designated display object of the one of the display areas, configured to include the designated display object in the display objects of the other of the display areas, and configured to differentiate the designated display object from the other display objects in the other of the display areas.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a diagram showing an example of the machining program according to the first embodiment.

FIG. 6 is a plan view showing an example of the editing assist image according to the first embodiment.

FIG. 8 is a view showing an example of the machining unit in one machining process according to the first embodiment.

FIG. 9 is a perspective view showing a machining shape defined by the above machining unit.

FIG. 10 is a view showing an example of the machining unit in one machining process according to the first embodiment.

FIGS. 14A and 14B are views showing an example of processing when tapping in the shape display area according to the first embodiment.

FIG. 19 is a view showing an example of the machining program according to the second embodiment.

FIG. 22 is a diagram showing the process information table according to the second embodiment.

FIG. 23 is a diagram showing the coordinate value table according to the second embodiment.

FIGS. 25A and 25B are views showing the processing when tapping the process list display area according to the second embodiment.

FIG. 29 is a diagram showing an example of the code regarded as a title of the process list display area according to the third embodiment.

DESCRIPTION OF THE EMBODIMENTS

Figure 1:
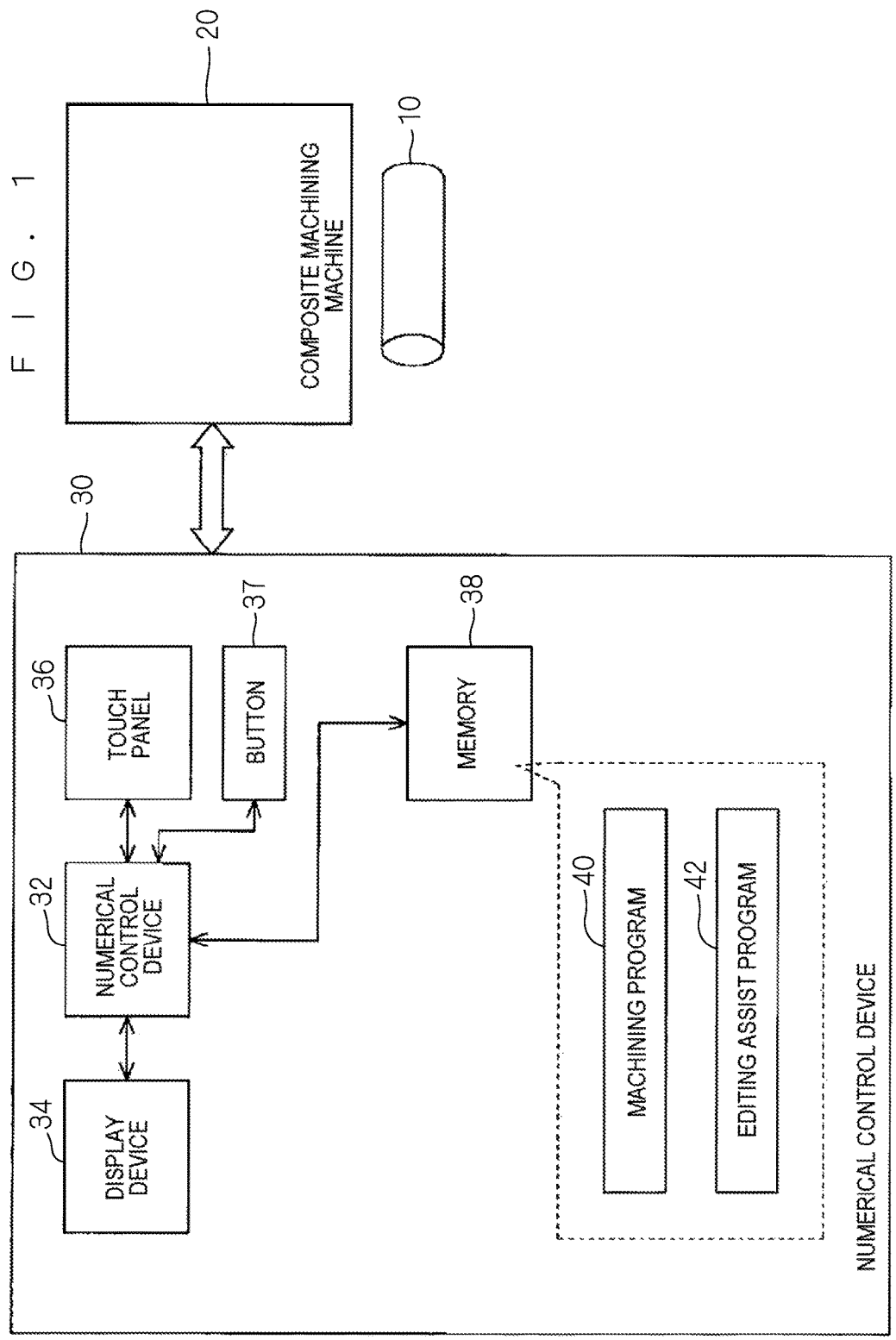
FIG. 1 is a system configuration according to the first embodiment.

The embodiments will now be described with reference to the accompanying drawings, wherein like reference numerals designate corresponding or identical elements throughout the various drawings.

A First Embodiment

A first embodiment of a machining program editing assist apparatus will be described below with reference to the drawings.

FIG. 1 shows a system configuration of the present embodiment.

Workpiece 10 is a machining object. A composite machining machine 20 includes a function of machining the rotating workpiece 10 with a tool and a function of machining the fixed workpiece 10 with a moving tool. In other words, the composite machining machine 20 is a machine tool having functions of turning, milling, drilling and others.

A numerical control device 30 transmits command signals to the composite machining machine 20 in order to machine the workpiece 10. The numerical control device 30 includes a central processing unit (CPU) 32, a display device 34, a touch panel 36, a button 37 and a memory 38. The display device 34 includes a display panel, e.g., a liquid crystal display panel or an organic Electro-Luminescence (EL) display panel. Character strings or graphic images are displayed on the screen of the device. The touch panel 36 is placed on the screen of the display device 34. The touch panel 36 is an input device that has a function of detecting an indicated point which a pointing tool such as a finger or a pointer touches or approaches within a certain distance. The button 37, independent of the touch panel 36, is a dedicated input device used when an operator gives specific instructions to the numerical control device 30.

The memory 38 is stored with data including the programs to be preliminarily put in the numerical control device 30 and has a function to memorize data that are temporarily used when the CPU 32 performs processing. In particular, the memory 38 is stored with a machining program 40 and an editing assist program 42.

Figures 2, 3:
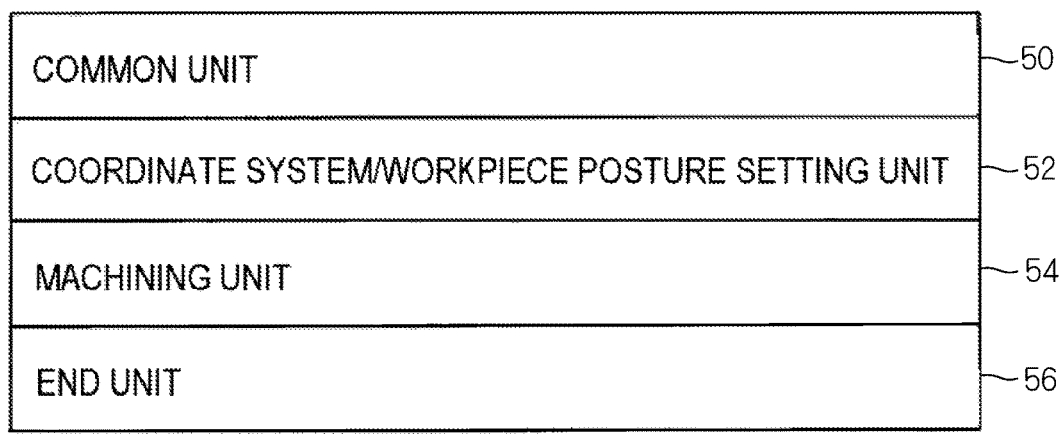
FIG. 2 is a diagram showing the configuration file of the machining program according to the first embodiment.
FIG. 3 is a diagram showing the variation of machining units according to the first embodiment.

FIG. 2 shows an example of a unit constituting the machining program 40 related to the present embodiment. In the present embodiment, a unit is data that define the machining to be performed, the operation of the peripheral device of the machine tool and the location to fix a workpiece, etc., and is an example of the program data in the machining program.

The machining program 40 related to the present embodiment is roughly composed of a common unit 50, a coordinate system/workpiece posture setting unit 52, a machining unit 54 and an end unit 56. In the present embodiment, the common unit 50 is always set at the head of the machining program 40. This is a unit to set data that are common across the program such as material quality, material shape, etc. and that include material shape data that define a material shape. The coordinate system/workpiece posture setting unit 52 is to set a coordinate value of a machining program origin position (basic coordinate system) in the machine coordinate system, or to set a workpiece posture during machining. The machining unit 54 is to describe the contents of a machining process. This unit has machining method data that declare a machining method, designate a tool to be used, and define a cutting condition including machining allowance, spindle rotation speed and tool feed rate, etc., for each machining process. In addition, the machining unit 54 includes the data of the machining shape. In detail, for each machining process, this data is removal shape data defining a removal shape that is the shape removed by performing the machining process.

Furthermore, the shape definition data, which define a workpiece shape for machining, include the above-mentioned material shape data and the above-mentioned removal shape data. The workpiece shape before executing the machining program is defined by the material shape data. The workpiece shape after performing machining in its each process is calculated by difference set operation between the workpiece shape before performing the machining of the machining process and the removal shape of the machining process. The defined shape, which is a shape obtained from the shape definition data, is a shape for machining and includes the material shape, the removal shape, the workpiece shape that is the shape after each machining process and the product shape that is the workpiece shape after all machining is finished. In addition, a unit of the machining process is one unit for the machining program editing assist apparatus to handle the data including a set of machining method data and a set of shape definition data.

The end unit 56 is set at the end of the machining program 40. It is a unit to mean the end of the machining program.

FIG. 3 shows the variation of the machining unit 54.

The machining method defined in the machining unit 54 is categorized into "point machining unit", "C-axis point machining unit", "line machining unit", "C-axis line machining unit", "face machining unit" and "turning unit". Each of the above units is subcategorized. For example, "point machining unit" is subcategorized into "drilling unit", "tapping unit" and others. The data meaning a unit name or a unit number out of the data contained in each of these units is an example of the process name data meaning the process name of the machining process.

Figure 4:
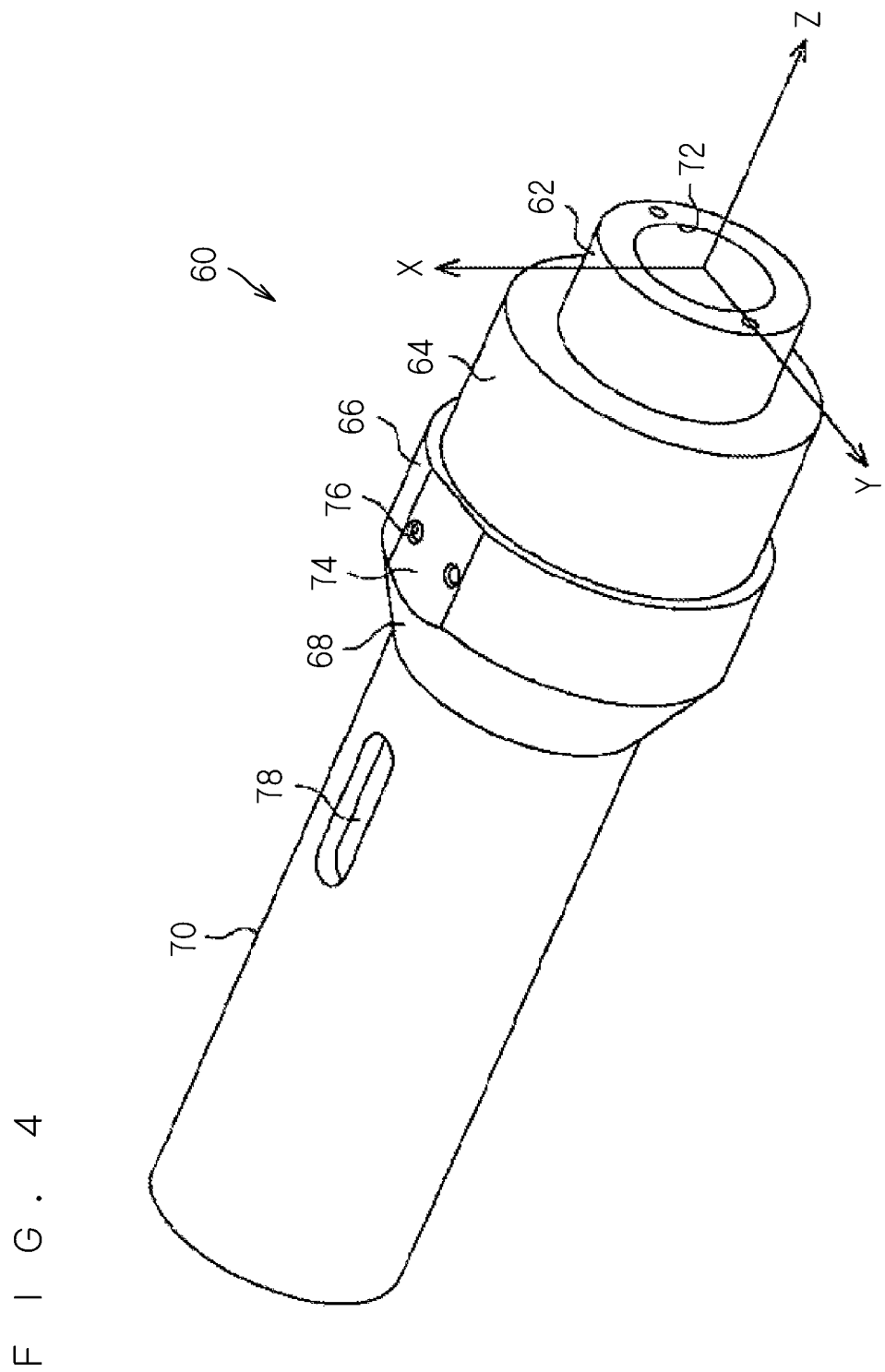
FIG. 4 is a perspective view showing the product shape according to the first embodiment.

FIG. 4 shows a product shape 60 that is a workpiece shape after completing all machining for the workpiece 10, which is utilized for explaining the present embodiment. The product shape 60 includes a first column portion 62, a second column portion 64 that has a larger outer diameter than the first column portion 62, a third column portion 66 that has a larger outer diameter than the second column portion 64, a taper portion 68 that is formed reducing the outer diameter from the third column portion 66 and a fourth column portion 70 connecting to the taper portion 68. On a part of the third column portion 66, a face-milling face 74 which is a flat face is formed. On the face-milling face 74, drilling holes 76 are formed. In addition, on the fourth column portion 70, a recessed portion 78 is formed.

FIG. 5 is the machining program 40 for machining the workpiece 10 into the product shape 60. The machining program 40 is composed of multiple units. Each unit has unit data that include the machining method data. It is noted that the machining unit 54 is different from other units in that it additionally has tool sequence data (SNo) and shape sequence data (FIG). The tool sequence data (SNo) constitute the machining method data and the shape sequence data (FIG) are an example of the removal shape data.

In this explanation, the unit with a unit number (UNo) "0", that is, the data at the head of the machining program 40, is the above-mentioned common unit 50. The unit with a unit number "1", "2", "3", "5", "7", "8" or "11" is the coordinate system/workpiece posture setting unit 52. The "FRM" unit and the "FRM Shift" unit are for defining a machining origin position. The "Head Selection" unit declares which spindle is used in the machining for a machine with multiple turning spindles. This unit is not used for a machine with a single turning spindle. An "index" unit is for setting a posture of a rotation axis that constitutes the machine. In this case, the "index" unit before a "bar-work" unit can set a tool spindle posture during turning, by setting a B-axis angle of the tool spindle. In addition, there is an instruction to make it possible that setting a C-axis angle of the turning spindle in the "index" unit before a "facing-mill" unit and a "drilling" unit defines the face of the workpiece to be machined, or setting a B-axis angle of the tool spindle defines a slant machining face. The "bar-work" unit with a unit number "4" is one of the units categorized as "turning unit" of the machining unit 54. The "turning unit" is a method for performing machining with a tool while rotating a workpiece, and the "bar-work" unit is a method for turning a bar-shaped workpiece. In the machining program 40, the processing (machining processing) for machining the workpiece 10 performed by the composite machining machine 20 and the numerical control device 30 is described in order of the machining process. However, the machining is not always performed in the described order, for example, it is possible to perform machining so that only the finish machining will be performed in the end of the machining, depending on the program configuration.

The above-mentioned editing assist program 42 is a program to assist programming and editing of the machining program 40.

FIG. 6 illustrates an editing assist image displayed on a screen 35 of the display device 34 by the CPU 32 performing the editing assist program 42.

The screen 35 that displays the editing assist image is, except for the upper edge area in FIG. 6, divided into a process list display area 35a, a shape display area 35b and a program data display area 35c. The process list display area 35a is a display area for which the name and the number of each unit of the machining program 40 are display candidates. The name and the number of each unit are examples of the process name. At least some of these candidates or more (from UNo. "0" to "11" in FIG. 5) are displayed in the process list display area 35a as the display objects.

The shape display area 35b is a display area for which the shapes (3D model) defined in the machining program 40 are the display candidates. When the shapes are actually displayed in the shape display area 35b, the 3D model is converted to the 2D model and the 2D image is displayed. In more detail, the candidates for the shape display area 35b include the removal shapes and the workpiece shapes. The removal shapes are defined in each machining process of the machining program 40. The workpiece shape is transformed by executing the machining program 40. The workpiece shape in each step is the material shape in the beginning, is transformed by removing the removal shape after performing each machining process, and is finally transformed to become the product shape 60. That is, the workpiece shape is different before and after performing each machining process.

The program data display area 35c is a display area for which the program data (detailed data) defining the contents of the machining program 40 are the display candidates. The detailed data define the contents of the machining processes described by the machining program 40, and include the tool sequence data and the shape sequence data etc. of the machining unit 54. At least some of the detailed data constituting the machining program 40 (the data of UNo. "0" to "3" and a part of the data of UNo. "4" in the FIG. 6) are displayed in the program data display area 35c as the display objects.

In addition, in FIG. 6, regarding the process list display area 35a, the unit with a larger number can be displayed with a scrolling function provided in the right edge area. Furthermore, in the shape display area 35b, the product shape model 60M can be enlarged with a pinch out operation, on the contrary, the product shape model 60M can be reduced with a pinch in operation. Moreover, the model can be shifted parallel and rotated. Also, in FIG. 6, the data defining the machining process below in the machining program 40 can be displayed with a scrolling function provided in the right edge of the program data display area 35c.

Figure 7:
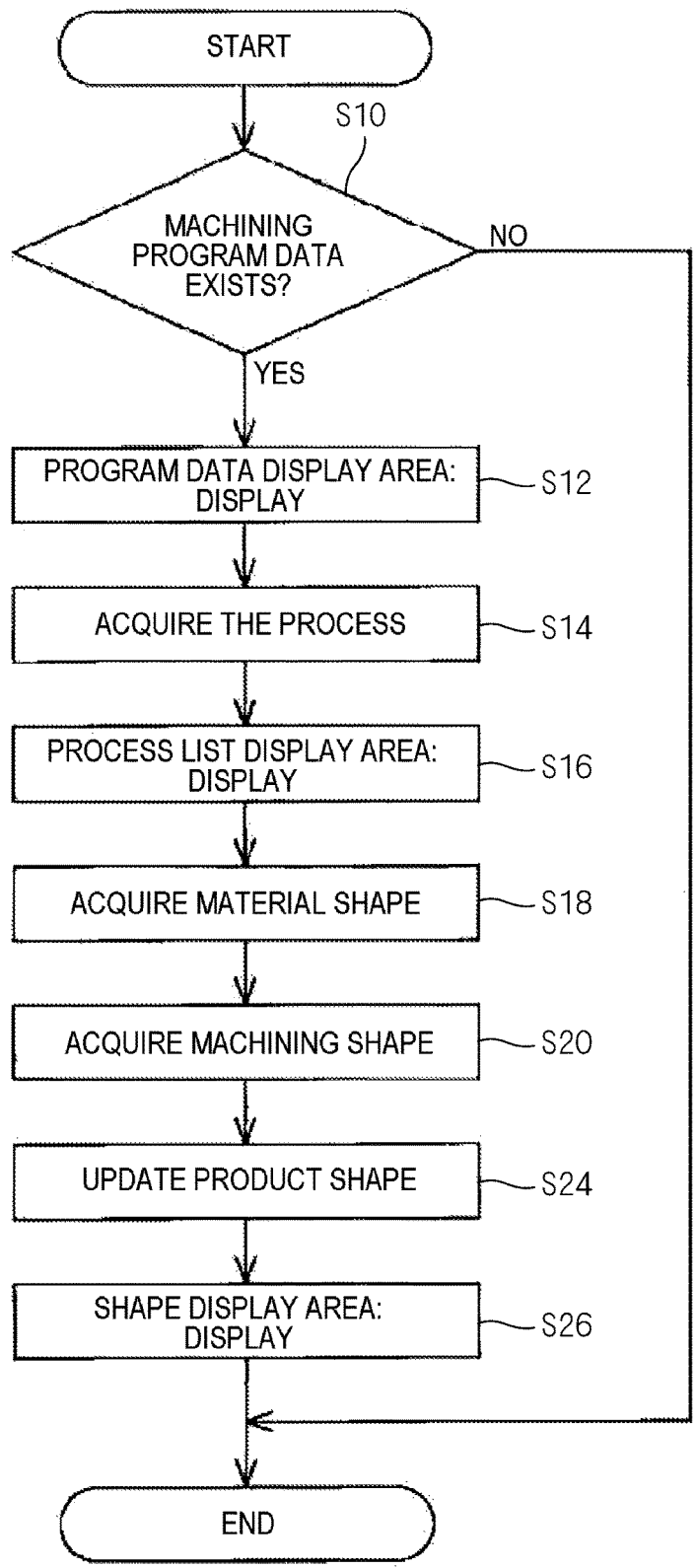
FIG. 7 is a flowchart showing the procedure of the initial display processing according to the first embodiment.

FIG. 7 shows a procedure for the display processing of the editing assist image shown in FIG. 6. The procedure shown in FIG. 7 is achieved by the CPU 32 executing the editing assist program 42. The procedure shown in FIG. 7 constitutes the control performed by a display control module (or a display controller).

In a series of the processing shown in FIG. 7, the CPU 32 first judges whether the designated machining program exists in the memory 38 (S10). When the CPU 32 judges that the designated machining program does not exist in the memory 38 (S10: NO), the CPU 32 once ends the series of the processing. On the contrary, when the CPU 32 judges that the designated machining program exists (S10: YES), the CPU 32 reads the machining program 40 and considers the data of the machining program 40 (detailed data) as the display objects from the top as much as possible to be displayed in the program data display area 35c. Then, the CPU 32 creates the display device 34 display the images of the character strings of the data in the program data display area 35c (S12).

Next, the CPU 32 acquires the data to be displayed in the process list display area 35a from the machining program 40

(S14). In more detail, the CPU 32 acquires sets of the unit number and the unit name of each of the units constituting the machining program 40. The CPU 32 has the acquired sets as the display candidates and has these sets as many as possible to be displayed from the top in the process list display area 35*a* as the display objects. The CPU 32 creates the display device 34 display the images of the character strings of these sets.

Next, the CPU 32 acquires the material shape data of the workpiece 10 from the machining program 40 and creates a 3D model (S18). Then, the CPU 32 creates a machining shape of each machining unit based on the data in the machining program 40 (S20). The machining shape of each machining unit is data that define the shape of the part to be machined in the machining unit and thereby removed. The machining shape is included in the defined shape and hereinafter may be referred to as the removal shape. The CPU 32 can calculate the removal shape based on the data in the machining unit and creates this a 3D model also. Then, based on the material shape model acquired in the step S18 and based on the machining shape models that are removal shapes in each machining unit and that are acquired in the step S20, the CPU 32 creates the product shape model 60M (S24). That is to say, the workpiece model after the machining, which is an example of the workpiece shape, is made with the difference set operation between the workpiece model expressing the workpiece shape before executing the machining unit and the machining shape model of the machining unit. The CPU 32 performs this procedure from the beginning to the end of the machining program in accordance with the machining program to create the product shape model M60. The detailed explanation about making the product shape model M60 is given below.

FIG. 8 illustrates the program data of the "bar-work" unit of UNo. "4" of the machining program 40 shown in FIG. 5. The "bar-work" unit is, as shown in FIG. 3, one of the "turning units". In the present embodiment, the "bar-work" unit of the unit number "4" has the data of the "machining part" selecting for "outer diameter" and is correspondent to the machining process by turning to form the outer circumference of the product shape 60 shown in FIG. 4. The machining part is a part of the information to define the unit.

As shown in FIG. 8, the machining unit 54 includes the tool sequence data (SNo) that define a tool as well as its cutting condition and the shape sequence data (FIG) that define the machining shape to be machined in this unit. The number of the rows of the tool sequence data (SNo) shows the number of the tools to be used in this unit. The "R" and "F" at the top mean that the "R" is a tool for rough machining and the "F" is a tool for finish machining, and the number put next to the "R" and "F" shows the order of using them. The shape sequence data has no limitation to the number of rows.

The position that is set in each line of the shape sequence data (FIG) is defined by the coordinate values of X-axis, Y-axis and Z-axis in the coordinate system illustrated in FIG. 4. The coordinate system is defined in the unit number "1" of the machining program 40 shown in FIG. 5. The shape sequence data (FIG) of the "turning unit" define the sectional shape of a solid of revolution, on the X-Z plane. This shape sequence data (FIG) can specify the shape (machining shape) to be removed by machining in this machining unit. In the example shown in FIG. 8, the shape sequence data (FIG) comprise five rows of sequence data. The "line" in the row "1" is correspondent to the shape of the first column portion 62 in FIG. 4, and the "line" in the row "2" is correspondent to the second column portion 64. The data following these are correspondent to the third column portion 66, the taper portion 68 and the fourth column portion 70. Rotating the sectional shape on the X-Z plane as specified above creates a bar-work model. Then, performing the difference set operation between the material shape model and the bar-work model creates the machining shape model 62M of the "bar-work" unit shown in FIG. 9. In more detail, the material shape model is the workpiece model before the machining of the UNo. "4" is performed and the machining shape model 62M is an example of the removal shape that is an example of the defined shape. As shown in FIG. 9, FIG. 13B and FIG. 14A, the machining shape model 62M and the symbol of the orthogonal coordinate system are displayed in the shape display area 35*b*. The symbol of the orthogonal coordinate system shows the position of the origin of the coordinate system and arrows indicating the "+" direction of each of X, Y and Z axes. The machining shape of the "bar-work" unit is defined with the coordinate values based on this coordinate system. When an operator inexperienced in making machining programs enters coordinate values based on an incorrect coordinate system, a different shape from the shape the operator desired is displayed together with the symbol of the orthogonal coordinate system. This allows the operator to know immediately that the entered coordinate value was not correct because the wrong coordinate system was adopted.

FIG. 10 shows the program data of the "face-milling" unit of the UNo. "9" of the machining program 40 shown in FIG. 5. As shown in FIG. 3, the "face-milling" unit is one of the "face machining units". In the present embodiment, performing the machining of the "face-milling" unit foul's the face-milling face 74 shown in FIG. 4.

Figure 11:
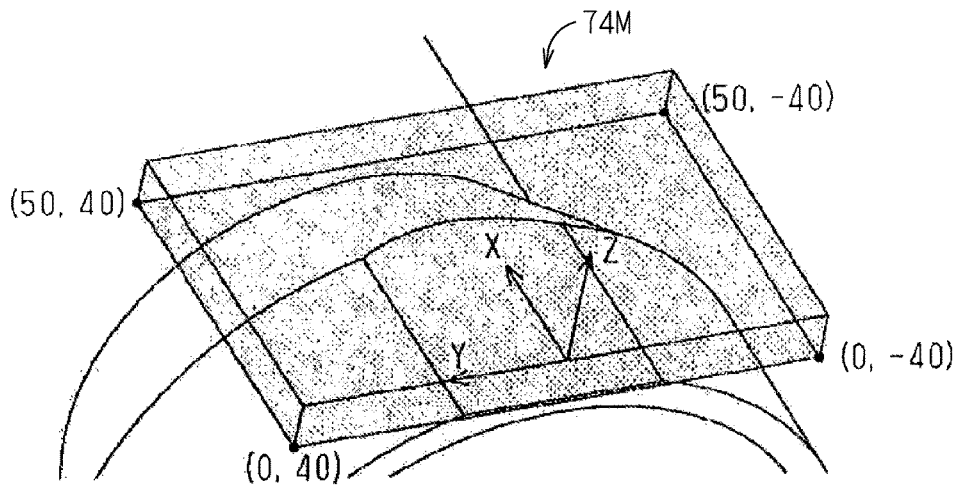
FIG. 11 is a perspective view showing a machining shape defined by the above machining unit.

The shape sequence data (FIG) shown in FIG. 10 comprise four rows and specify the machining area on the X-Y plane of the "face-milling" unit. The data of "depth" and "allowance-Z" constitute the unit data. The "depth" and the "allowance-Z" define the height position of the machining face (the height position of the machining face is the height position from the Z-axis origin position by the "depth") and the thickness (the thickness from the machining face is the "allowance-Z"). These data of the machining area, the height position from the machining face and the thickness create the machining shape model 74M of the "face-milling" unit shaded in FIG. 11. The machining shape model 74M is an example of the removal shape that is included in the defined shape. As shown in FIG. 11 and FIG. 14A, the machining shape model 74M is displayed with the XY coordinate values of each corner, (50, 40), (0, 40), (0, −40) and (50, −40) and with the symbol of the orthogonal coordinate system in the shape display area 35*b*. The XY coordinate values are specified in the shape sequence data (FIG). The symbol of the orthogonal coordinate system shows the position of the origin of the coordinate system defined in the "FRM Shift" unit of the unit number "8" and arrows indicating the "+" direction of the coordinate system. When the operator fails to identify the coordinate system set in advance or when the setting of the coordinate system defined by the program data is incorrect, a different machining shape model from the shape the operator desires is displayed. Even in this situation, thanks to the symbol of the orthogonal coordinate system displayed with the machining shape model, it is easy for the operator to know the mistake. In addition, the coordinate value data is displayed in the vicinity of the point indicated by the coordinate value data, which constitutes the machining shape model. Therefore, the operator can notice an inputting error by comparing the partial shape of the machining shape model under editing and the other shape(s) displayed around it concerning the shape size and the coordinate value data. In addition, as explained later, it is permitted to enter rough values that are not exactly the same coordinate values specifying the machining shape model. However, entering the values that are greatly different from the values of the actual shape leads to ineffective machining because machining operation is performed in an area where the workpiece does not exist. On the other hand, trying to change the coordinate value data while checking the machining shape model and the coordinate value data improves the machining program so that more effective machining can be performed. This makes it easier even for the operator poor versed in operating the above device to improve the machining program.

FIG. 10 shows an example in which the coordinate values specified in the shape sequence data (FIG) are not the same as those of the boundary of the actual face-milling face 74. This inconsistency has been caused because the machining program 40 was made roughly. That is, entering the values exactly the same as the coordinate values on the boundary of the face-milling face 74 requires the operator to do complicated calculation. However, if the purpose is to form a plane perpendicular to Z-axis shown in FIG. 11 on the third column portion 66, for example, these coordinate values of the boundary are theoretically not necessary. Determining the coordinate value of Z-axis can define the face-milling face 74 unambiguously. Considering this, when creating the machining program 40, entering X-Y axis coordinate values roughly calculated to be outside the boundary of the actual face-milling face 74 as the component of each X-axis and Y-axis creates the machining program 40 more easily. When the coordinate values are entered in the above way, as shown in FIG. 11, even a larger machining area of the machining shape defined in the above way than the actual face-milling face 74 can define the desired product shape to be obtained after machining. That is, performing the difference set operation between the material shape model and the machining shape model 62M of the "bar-work" unit shown in FIG. 9, and furthermore, performing the difference set operation between the above operation result and the machining shape model 74M of the "face-milling" unit, forms the face-milling face 74 on the workpiece model. Each of the above material shape model, machining shape model 62M of the "bar-work" unit and machining shape model 74M of the "face-milling" unit is an example of the defined shapes.

Applying this calculation to the machining program 40 from its top to its end unit creates the product shape model 60M shown in FIG. 4.

In FIG. 7, the CPU 32 displays the obtained workpiece model (workpiece shape) in the shape display area 35b (S26). When the machining program is newly designated, the workpiece model as a result of applying the above method to all the program data of the designated machining program is initially displayed in the shape display area 35b. In the case of the completed machining program, the displayed workpiece model is the product shape model 60M. It is noted that all the calculation described above is performed with 3D models. These 3D models are converted to 2D shapes for display in the shape display area 35b, based on a viewpoint set accordingly. That is, the 3D models are projected onto a projection surface. These 2D shapes are displayed in the shape display area 35b. Then, the CPU 32 finishes the series of the procedure shown in FIG. 7.

In this way, the CPU 32 displays the editing assist image shown in FIG. 6 in the screen 35.

The CPU 32 achieves the function to assist the operator in editing the machining program 40 by executing the above editing assist program 42 to display the editing assist image shown in FIG. 6. As stated above, the screen 35 has the touch panel 36 placed on it. As a result, when the operator taps an area right above the specific point on the screen 35 covered by the touch panel 36 based on the editing assist image displayed on the screen 35, the CPU 32 can realize which part of the editing assist image the operator has designated based on the output signal from the touch panel 36. When any one of the display objects of any one of the display areas of the process list display area 35a, the shape display area 35b and the program data display area 35c is designated, the CPU 32 changes the display objects of the other display areas so that the display objects of the other display areas are correspondent to the above display object designated in the one of the display areas. In other words, assuming that any display area of the process list display area 35a, the shape display area 35b and the program data display area 35c is a target display area, when any display object of the target display area is designated, the CPU 32 changes the display objects of the display areas other than the target display area so that the machining processes of the display objects of the display areas other than the target display area and the machining process of the above designated display candidate are consistent. In some cases, hereinafter, tapping an area right above the specific point on the editing assist image covered with the touch panel 36 is referred to as tapping the specific point on the editing assist image.

Figure 12:
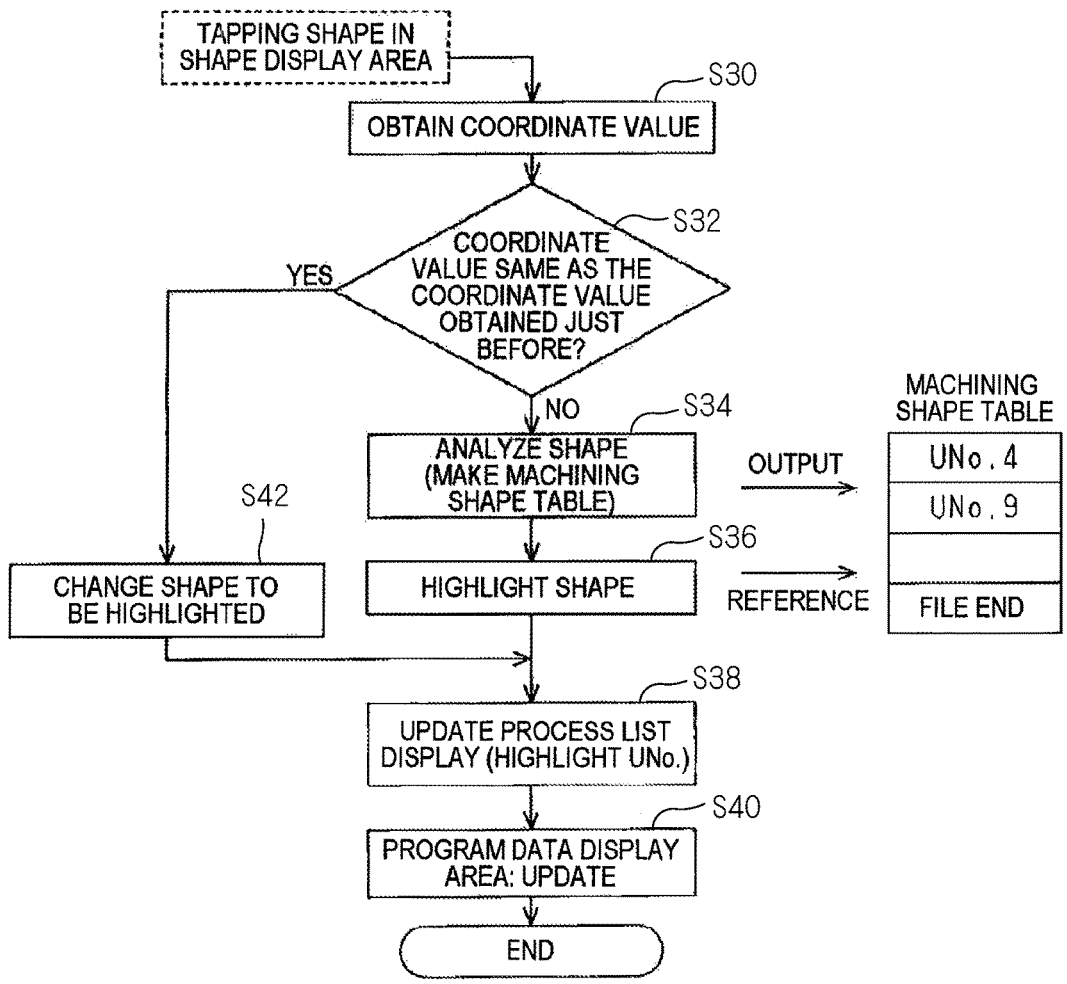
FIG. 12 is a flowchart showing the procedure when tapping in the shape display area according to the first embodiment.

FIG. 12 shows the procedure in the case that a specific point is indicated in the shape display area 35b. The procedure shown in FIG. 12 is achieved by the CPU 32 executing the editing assist program 42. The procedure shown in FIG. 12 constitutes the control performed by the display control module.

Tapping a specific point in the shape display area 35b when the display object is displayed in the shape display area 35b allows the CPU 32 to obtain the coordinate value of the screen 35 of the tapped point (indicated point) based on an output value from the touch panel 36 (S30). Then, the CPU 32 judges whether the obtained coordinate value is the same as the coordinate value of the indicated point obtained just before the processing (S32). It is noted that, in this judgment, when the coordinate value obtained in the present processing is within an area that has a certain radius from the indicated point obtained in the last processing, the coordinate value may be judged to be the same.

Then, in the case the CPU 32 judges that it is not the same (S32: NO), the CPU 32 extracts the display candidates designated based on the display objects displayed in the shape display area 35b and the above indicated point, and creates a machining shape table (S34) as the operator designates the display candidates of the shape display area 35b. To be concrete, regarding the product shape model 60M displayed in the shape display area 35b, the CPU 32 converts the machining shape models (removal shapes) of each machining unit to the 2D shapes under the same condition as the condition in which the product shape model 60M is converted to the 2D shape and stores them, although this is not displayed. As stated before, performing the difference set operation between the workpiece model (workpiece shape) before machining of the machining unit and the machining shape model (removal shape) of the machining unit creates the workpiece model (workpiece shape) after machining. Therefore, each of the machining shape models (removal shapes) of all the machining units always exist in the area showing the portion to be machined with each of the machining units of the product shape model 60M. Then, the CPU 32 judges whether the coordinate value of the indicated point is in the area of each of the 2D models converted from machining shape models and extracts the machining unit whose 2D machining shape model includes the coordinate value of the indicated point, and creates the machining shape table. FIG. 12 shows an example of the machining shape table having two units of the UNo. 4 and the UNo. 9 that are extracted. It is noted that the extracted machining units have the specific point (indicated point) inside their removal shapes when the removal shapes are displayed in the shape display area 35b.

Figure 13A:
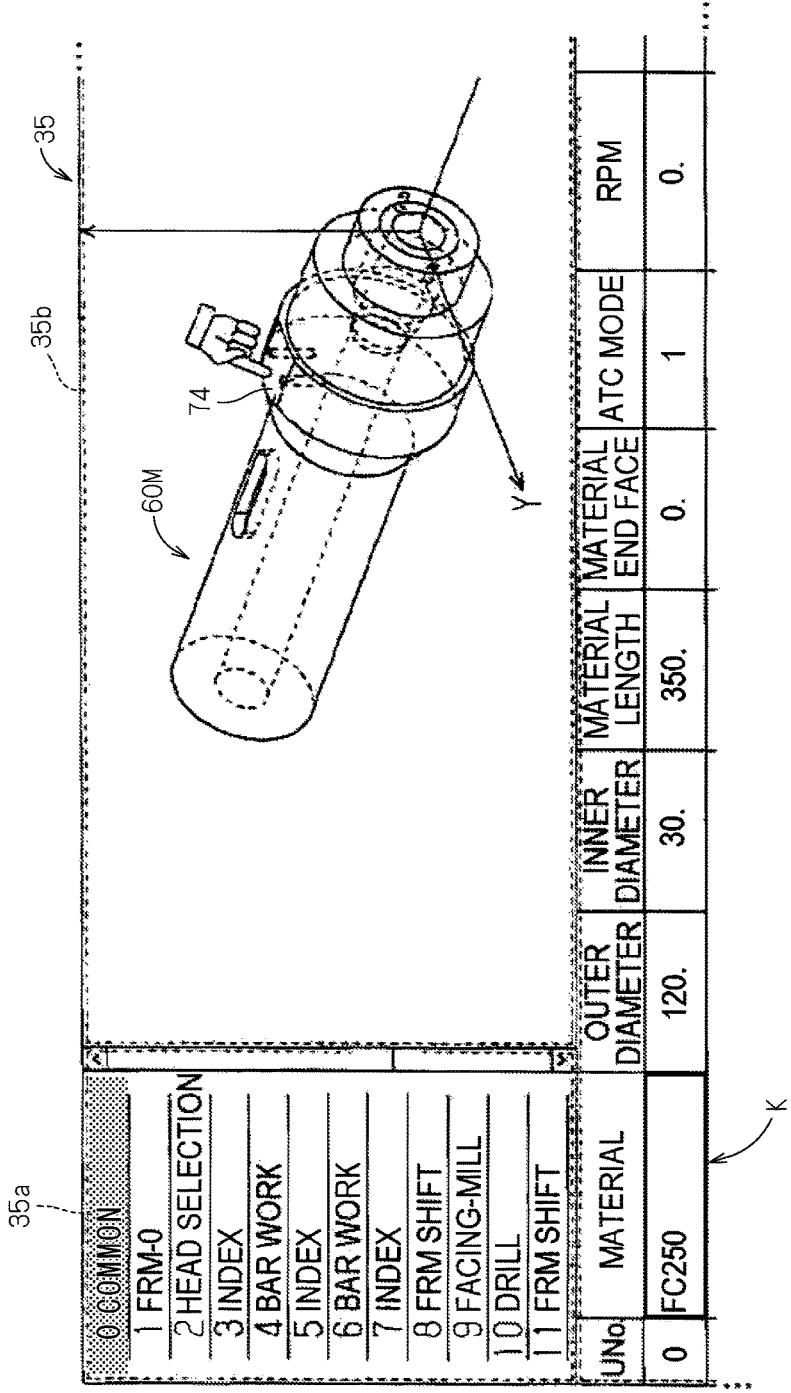
FIGS. 13A and 13B are views showing an example of processing when tapping in the shape display area according to the first embodiment.
Figure 13B:
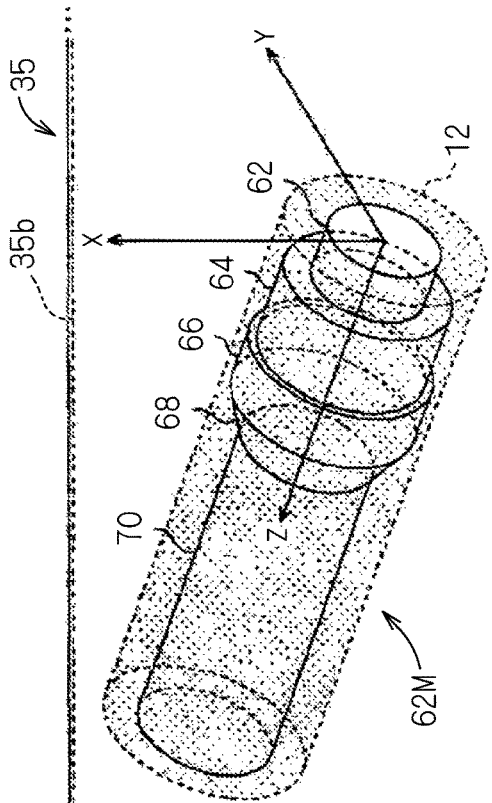

FIG. 13A shows a case of tapping the face-milling face 74 of the product shape model 60M displayed in the shape display area 35b. The CPU 32 extracts not only the machining unit for machining the face-milling face 74 but also the machining unit having the above indicated point in its removal shape converted into the 2D image in the shape display area 35b. Then, the CPU 32 puts the extracted machining units in the order of the machining program 40 to create a machining shape table. In this explanation, as is obvious from FIG. 13A, the above indicated point is in the machining shape of the "face-milling face 74" and in the machining shape of the "bar-work" unit in the vicinity of the third column portion 66 defined by the "bar-work" unit. Therefore, extracting these units and putting them in the order of machining create the machining shape table having the UNo. 4 and UNo. 9.

In FIG. 12, the CPU 32 makes the display device 34 highlight the machining shape model of the machining unit 54 registered at the top of the machining shape table as a designated display object (S36).

FIG. 13B shows the result of tapping the part of the face-milling face 74 displayed in the shape display area 35b on the touch panel 36. The CPU 32 obtains the UNo. "4" from the machining shape table, and, as shown in FIG. 13B, displays the machining shape model 62M of the "bar-work" unit on the display of the workpiece model before machining of the UNo. "4", in the shape display area 35b. In the present embodiment, the machining shape model 62M is highlighted with a different color and with higher brightness, but in the figures it is highlighted with shading. It is noted that the highlighting is for differentiating the machining shape model 62M from the other display object displayed in the shape display area 35b. In this case, because there are no machining units before the UNo. "4", the workpiece model at this time is the same as the material shape model. As stated in the explanation of the calculation of the machining shape model of the "bar-work" unit, the material shape model is presented as a part of the machining shape model 62M of the "bar-work" unit.

In FIG. 12, the CPU 32 makes the display device 34 change the designated display object of the process list display area 35a in such a way that the display object that is correspondent to the highlighted portion in the shape display area 35b is highlighted as the designated display object (S38). That is, the display of the "common" of the UNo. "0" highlighted as the designated display object as shown in FIG. 13A is changed to the display of the "bar-work" of the UNo. "4" highlighted as the designated display object as shown in FIG. 13B. It is noted that in the present embodiment, highlighting the machining process (unit name) is represented by a different color and higher brightness, but in the figures, highlighting is represented by shading.

In FIG. 12, the CPU 32 considers the program data of the "bar-work" unit of the UNo. "4" as the designated display objects and makes the display device 34 display the data from the top in the program data display area 35c. The CPU 32 also puts a cursor K to this part (S40). That is, the display showing the program data of the UNo. "0" from the top as the designated display objects, as shown in FIG. 13A, is changed to the display showing the program data of the UNo. "4" from the top as the designated display objects, as shown in FIG. 13B. The CPU processing to show the data from the top of them is for differentiating the designated display objects from the other display candidates of the program data display area 35c.

FIG. 13B shows an example of the cursor K moved onto the characters of "bar-work" which is displayed in the right of the area showing that the UNo. is "4". This also indicates that the data on which the cursor K is put can be modified. This cursor K also aims to differentiate the designated display object from the other display candidates and to make it stand out.

In FIG. 12, when the CPU 32 judges that the coordinate value obtained in the present processing is the same as the coordinate value of the specific point obtained just before the processing (S32: YES), the CPU 32 considers the machining unit 54 of the next unit number from the machining shape table as the designated display object and highlights this (S42).

Figure 14B:
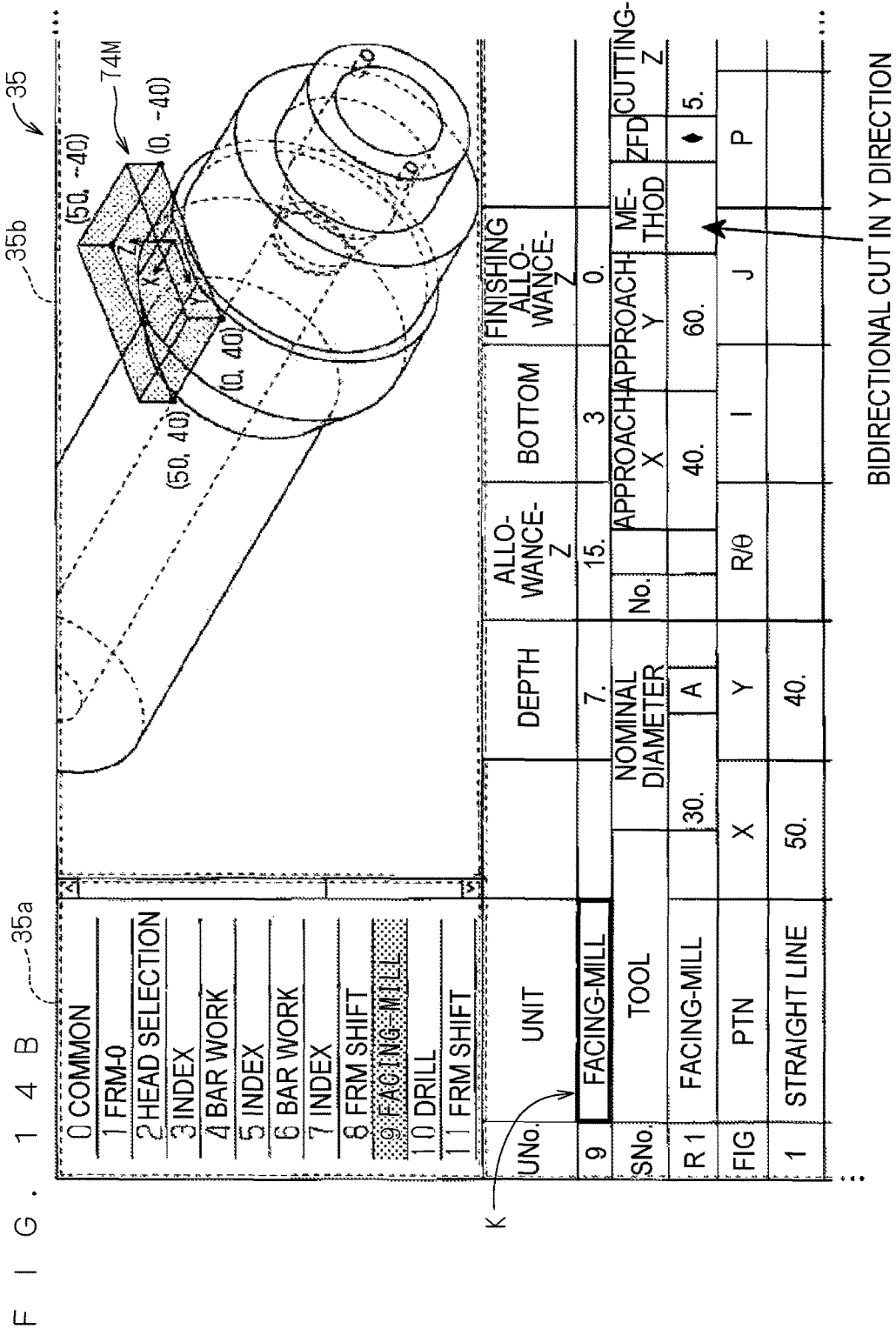

FIG. 14A shows the case that the operator taps the face-milling face 74 once again when the "bar-work" unit of the UNo. "4" is displayed as the designated display object and highlighted in the shape display area 35b. The CPU 32 judges that the tapped coordinate value is the same as the coordinate value obtained just before the processing, and obtains the UNo. "9" which comes next to the UNo. "4" in the machining shape table, which is highlighted as the designated display object just before the processing. Then, as shown in FIG. 14B, the workpiece model before machining of the UNo. 9 is displayed in the shape display area 35b, and then, the CPU 32 displays the machining shape to be machined by the "face-milling" unit and highlights the machining shape as the designated display object. Then, the CPU 32 executes the step S38 and the step S40 of FIG. 12 and updates the display of the process list display area 35a and of the program data display area 35c. FIG. 14B shows that the "face-milling" unit of the UNo. "9" is displayed as the designated display object and highlighted in the process list display area 35a and also shows that the detailed data of the "face-milling" unit of the UNo. "9" are displayed from the top of them, as the designated displayed objects, in the program data display area 35c. In the case that face-milling face 74 is tapped again when the machining shape of the "face-milling" unit of the UNo. "9" is displayed as the designated display object and highlighted, if there are no unit numbers registered after the UNo. "9" in the machining shape table, the unit number at the top of the machining shape table is adopted, and the machining shape of the "bar-work" unit of the UNo. "4" is again displayed as the designated display object and highlighted. That is, the cyclically next candidate for the designated display object in accordance with the order of the candidates registered in the machining shape table is decided as the designated display object.

In FIG. 12, the CPU 32 ends the series of this procedure when it completes the processing of the step S40.

According to the procedure shown in FIG. 12, when the operator feels something strange in the machining shape displayed in the shape display area 35b, tapping the strange point allows the operator to know immediately the location of the machining process having the strange shape in the entire machining processes, by means of the machining process highlighted in the process list display area 35a. In addition, the detailed data of the related machining program

40 displayed from the top in the program data display area 35*c* allow the operator to know immediately the program data of the strange machining shape.

Figure 15:
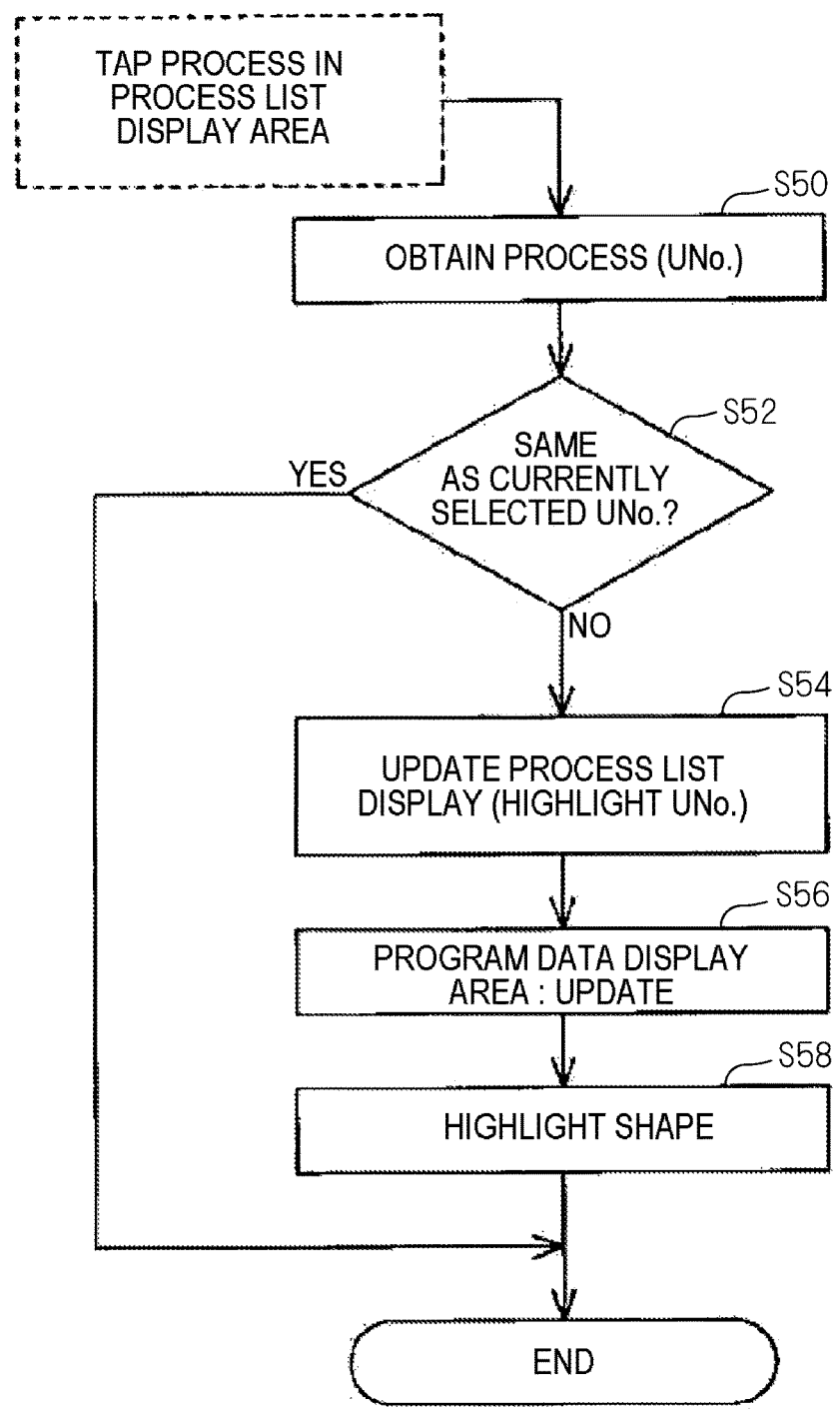
FIG. 15 is a flowchart showing the procedure of the processing when tapping in the process list display area according to the first embodiment.

FIG. 15 shows the procedure in the case that a specific point is tapped in the process list display area 35*a*. The procedure shown in FIG. 15 is achieved by the CPU 32 executing the editing assist program 42. The procedure shown in FIG. 15 constitutes the control performed by the display control module.

When the operator taps one of the character strings of the unit number or the unit name displayed in the process list display area 35*a*, the CPU 32 obtains a unit number represented by an image displayed in the area that includes the tapped specific point as the designated unit number, based on the output value from the touch panel 36 (S50). Next, the CPU 32 judges whether the obtained unit number is the same as the currently selected unit number (S52). When the CPU 32 judges that it is not the same as the currently selected unit number (S52: NO), the CPU 32 makes the display device 34 update the display of the process list display area 35*a* in such a way that the unit to be highlighted is changed to the unit of the designated unit number (S54). In other words, the CPU 32 changes the designated display object. Next, in the program data display area 35*c*, the CPU 32 makes the display device 34 display the detailed data of the machining program 40 correspondent to the unit obtained in the step S50 from the top of them, and also move the cursor onto that data (S56). Then, the CPU 32 makes the display device 34 highlight the removal shape to be machined by the machining process corresponding to the designated unit number, as the designated display object (S58). It is noted that in the case a different portion is being highlighted as the designated display object in the shape display area 35*b* before the processing of the step S58, all the display objects are deleted, and then the newly designated display object is highlighted on the workpiece model. In this way, for example, in the case the shape displayed in the shape display area 35*b* is shown as FIG. 14A, when the character string of the face-milling of the UNo. "9" is tapped in the process list display area 35*a*, the shape displayed in the shape display area 35*b* is updated, as shown in FIG. 14B. When the unit number tapped in the step S50 is not the unit number of the machining unit 54, the machining shape is not highlighted.

The CPU 32 ends the series of this procedure when it judges "YES" in the above step S52 or the processing of the step S58 is completed.

According to the procedure of FIG. 15, when the operator feels something strange to see a certain machining process in the list of the machining process displayed in the process list display area 35*a*, tapping the area in which the image of that machining process is displayed allows the operator to grasp immediately the machining shape to be machined in that machining process, by means of the highlighted display object in the shape display area 35*b*. In addition, the data of the machining program 40 displayed from the top in the program data display area 35*c* allows the operator to know the contents of the data defining the machining process quickly.

Figure 16:
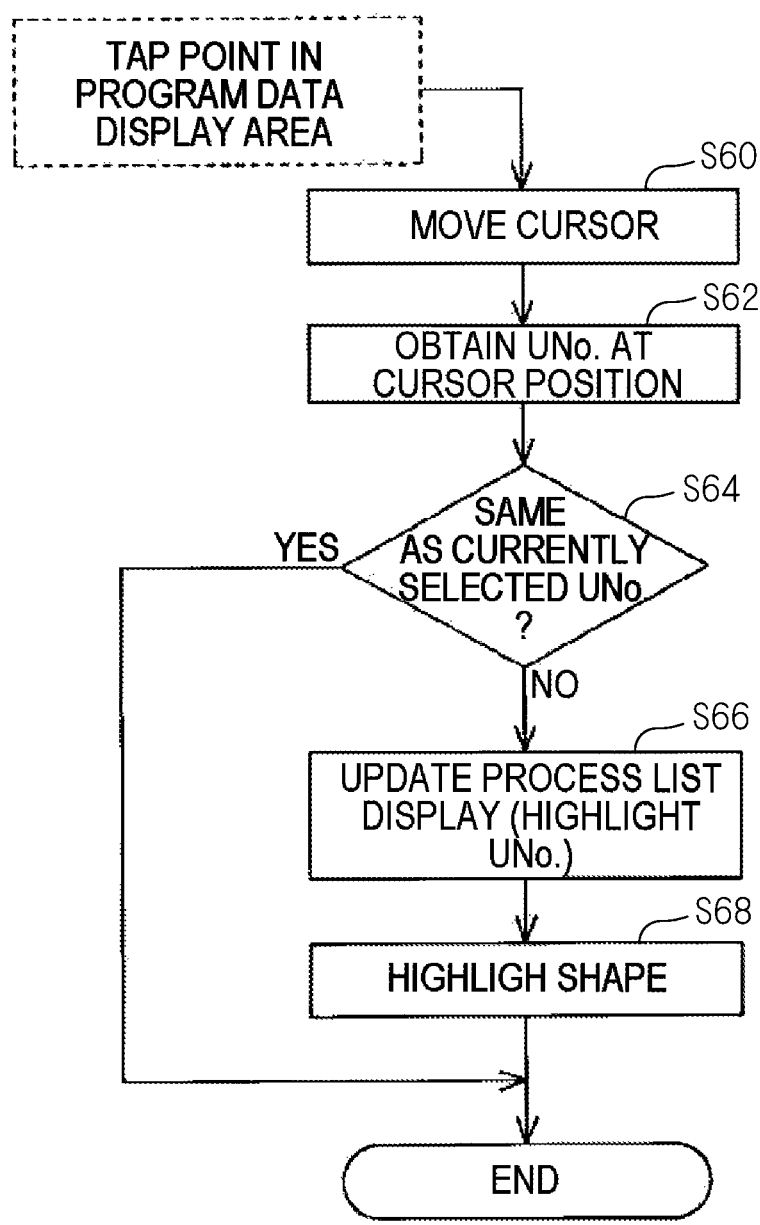
FIG. 16 is a flowchart showing the procedure of the processing when tapping in the program data display area according to the first embodiment.

FIG. 16 shows the procedure in the case that a specific point is indicated in the program data display area 35*c*. The procedure shown in FIG. 16 is achieved by the CPU 32 executing the editing assist program 42. The procedure shown in FIG. 16 constitutes the control performed by the display control module.

When the operator taps the specific point in the program data display area 35*c*, the CPU 32 judges that the data which is displayed in the area that includes the specific point is designated by the operator based on the output value from the touch panel 36, and makes the display device 34 move the cursor K to the data (S60). Next, the CPU 32 obtains the unit number corresponding to the data to which the cursor K has been moved (S62). Then, the CPU 32 judges whether the obtained unit number is the same as the currently selected unit number (S64). In other words, the CPU 32 judges whether the obtained unit number is the unit number currently displayed as the designated display object. When the CPU 32 judges it is not the same as the currently selected unit number (S64: NO), the CPU 32 makes the display device 34 change the unit to be highlighted in the process list display area 35*a* (S66). And, the CPU 32 makes the display device 34 update the shape to be highlighted in the shape display area 35*b* (S68). It is noted that in the case that the data designated by the unit number is the data of the machining unit 54, the CPU 32 changes the display object to be highlighted. In this way, in the case the shape displayed in the display area 35*b* is shown as FIG. 14A, for example, when the operator scrolls the program data display area 35*c* and thereby the character string of the face-milling data of the UNo. "9" is displayed, tapping this character string updates the shape displayed in the shape display area 35*b* as shown in FIG. 14B. On the other hand, when the data designated by the unit number is not the data of the machining unit 54, highlighting is not performed.

The CPU 32 ends the series of the procedure shown in FIG. 16 when it judges "YES" in the above step S64 or when the processing of the step S68 is completed.

According to the procedure of FIG. 16, when the operator taps the data displayed in the program data display area 35*c*, the unit highlighted in the process list display area 35*a* allows the operator to know immediately the machining process defined by the above tapped data. In addition, the shape highlighted in the shape display area 35*b* allows the operator to know immediately the machining shape to be machined in the machining process.

According to the procedure of FIGS. 12, 15 and 16, the operator can easily grasp the machining process, the machining shape made by the machining process and the detailed data of the program of the machining process, in relation to one another.

Figure 17:
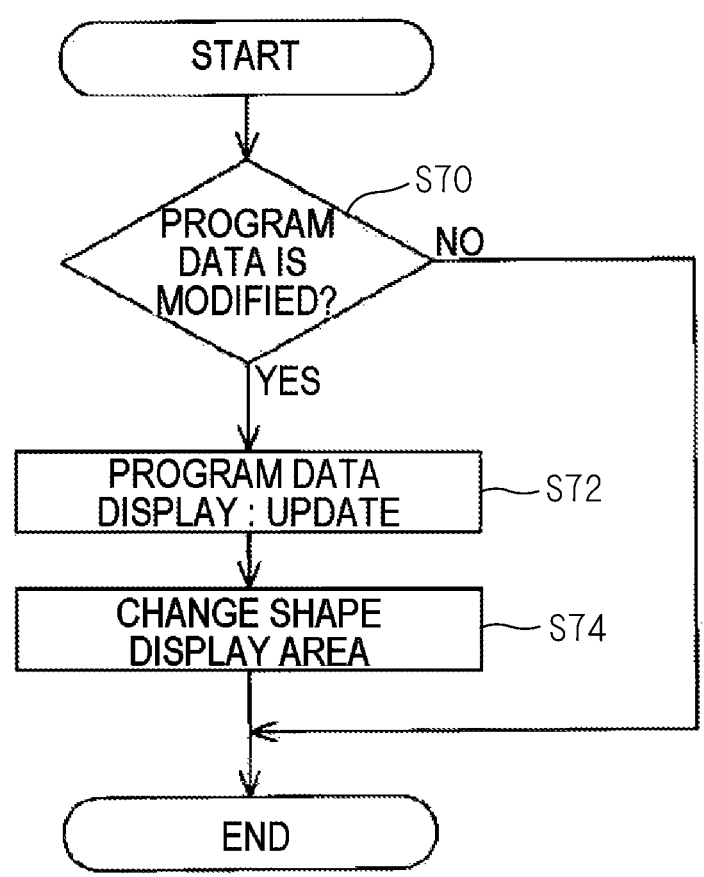
FIG. 17 is a flowchart showing the procedure of the processing when the data of the program data display area are updated according to the first embodiment.

FIG. 17 shows the procedure performed in the case when operation of the above button 37, etc., modifies the program data displayed in the program data display area 35*c*. The procedure shown in FIG. 17 is achieved by the CPU 32 executing the editing assist program 42. The procedure shown in FIG. 17 constitutes the control performed by the display control module.

In the series of the procedure shown in FIG. 17, the CPU 32 judges whether there is a modification of the program data displayed in the program data display area 35*c* (S70). Then, in the case that there is a modification of the program data (S70: YES), the CPU 32 updates the image of the program data displayed in the program data display area 35*c* (S72). Moreover, the CPU 32 changes the machining shape displayed in the shape display area 35*b*, based on the modified program data (S74). It is noted that the CPU 32 ends the series of this procedure when the processing of the step S74 is completed or the CPU 32 judges "NO" in the above step of S70.

Figure 18A:
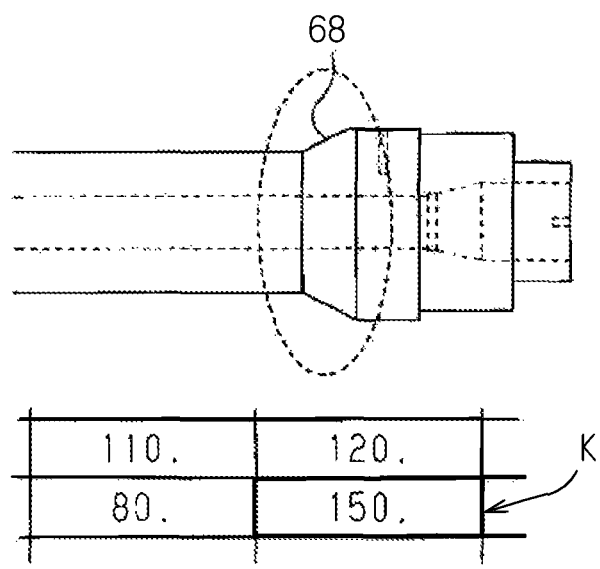
FIGS. 18A and 18B are views showing an example of the image when the data of the program data display area are updated according to the first embodiment.
Figure 18B:
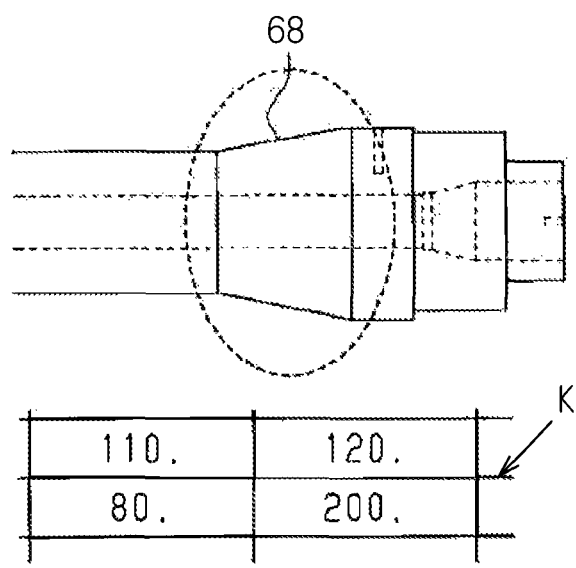

FIG. 18 shows an example of performing the procedure of FIG. 17. FIG. 18A shows an example where the cursor K is indicating the value "150" and thereby the value "150" can be modified. This value is correspondent to the "end point-Z" (coordinate value of Z-axis at the small diameter side of the taper portion) in the taper portion 68 of the product shape 60 shown in FIG. 4. FIG. 18B shows the example in which the above value has been modified to "200". In this case, the image is changed to the image of the modified taper portion 68 in the shape display area 35b. This procedure is achieved by the CPU 32 recalculating the machining shape defined by the "bar-work" unit of the unit number "4" and performing the difference set operation between the material shape, etc. and this recalculated machining shape. It is noted that the location of the cursor K in FIG. 18B is different from that in FIG. 18A. This is because fixing the value of "200" in FIG. 18B moves the cursor K.

In this way, the operator can grasp immediately how a modification of data in the machining program 40 changes the machining shape. This also allows the operator to know immediately an inputting error and so on.

It is noted that the procedures shown in FIGS. 12, 15, 16 and 17 are performed not only after the machining program 40 which machines the workpiece 10 into the product shape 60 is made. That is, these procedures can be performed even if the machining program 40 is incomplete, in the process of being made and is yet to machine the workpiece 10 into the product shape 60. Therefore, entering new data while the operator makes the program allows him to know what machining shape the newly entered data creates, immediately.

A Second Embodiment

A second embodiment of the machining program editing assist apparatus will be described with reference to the drawings below, mainly about the differences from the first embodiment.

Figure 19:
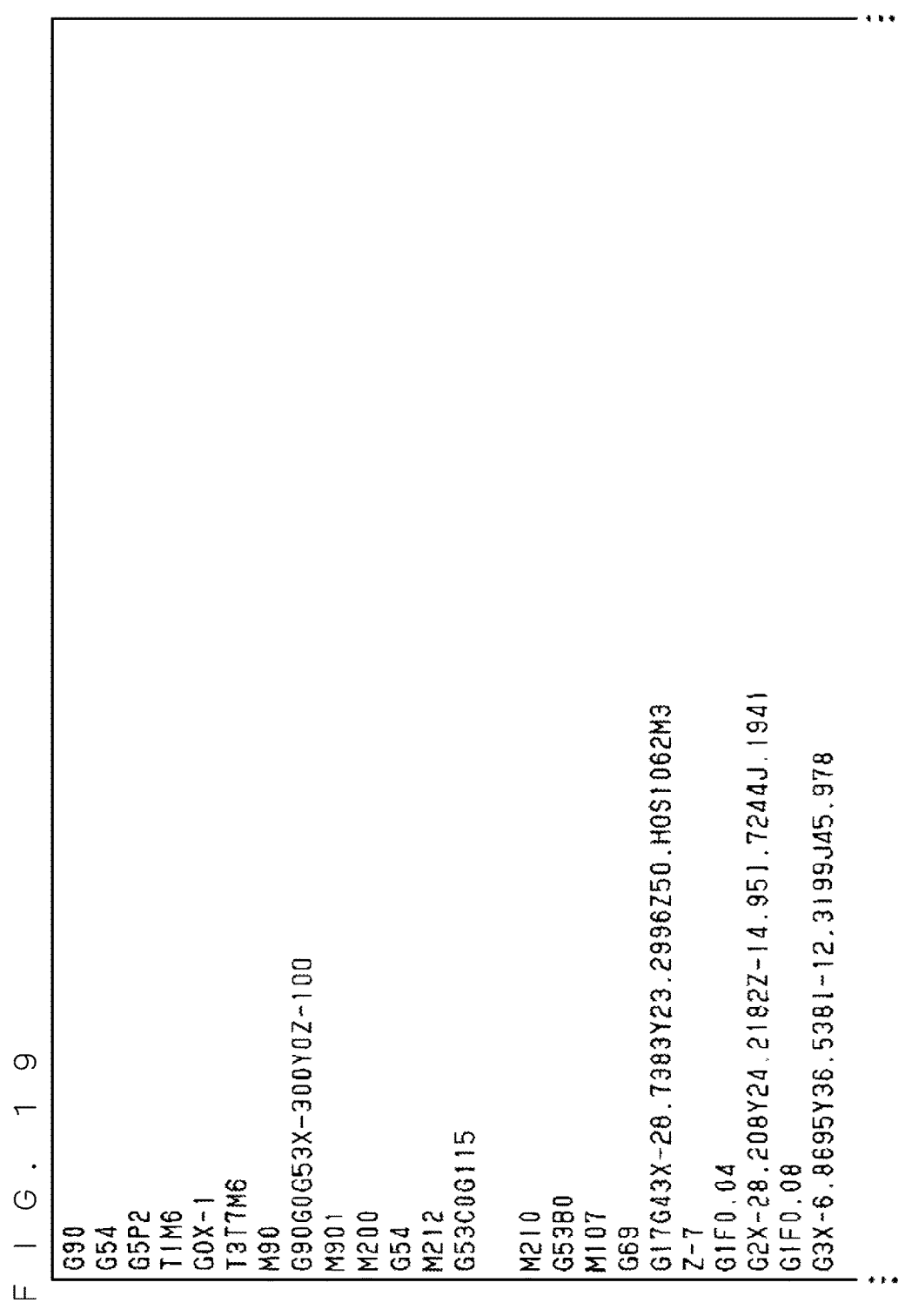

The machining program 40 of the present embodiment conforms to the EIA/ISO standard. FIG. 19 shows an example of the machining program 40 of the present embodiment.

As shown in this figure, in the present embodiment, the program describes using the codes including G-code and T-code. These codes are examples of the command codes prescribed in the international EIA/ISO standard. T-code is assigned for designating a tool to perform machining T-code is an example of a tool change command code. S-code is assigned for instructing the rotation speed when the tool or the workpiece rotates. F-code is assigned for instructing the relative feed rate of the tool and the workpiece when machining is performed. T-code, S-code and F-code are examples of machining method data. On the contrary, at least some of G-code that is an example of command code which declares a tool path, and the coordinate value data of the instruction position are examples of shape definition data. Some of G-code and its accompanying coordinate value data are also referred to as the shape instruction code. As shown in the figure, the machining program 40 of the present embodiment has no data that represents only the machining process. So, in the machining program editing assist apparatus of the present embodiment, T-code, which designates a tool for machining the workpiece 10, is regarded as a separation of the machining process, and the T-code is handled as process name data.

Figure 20:
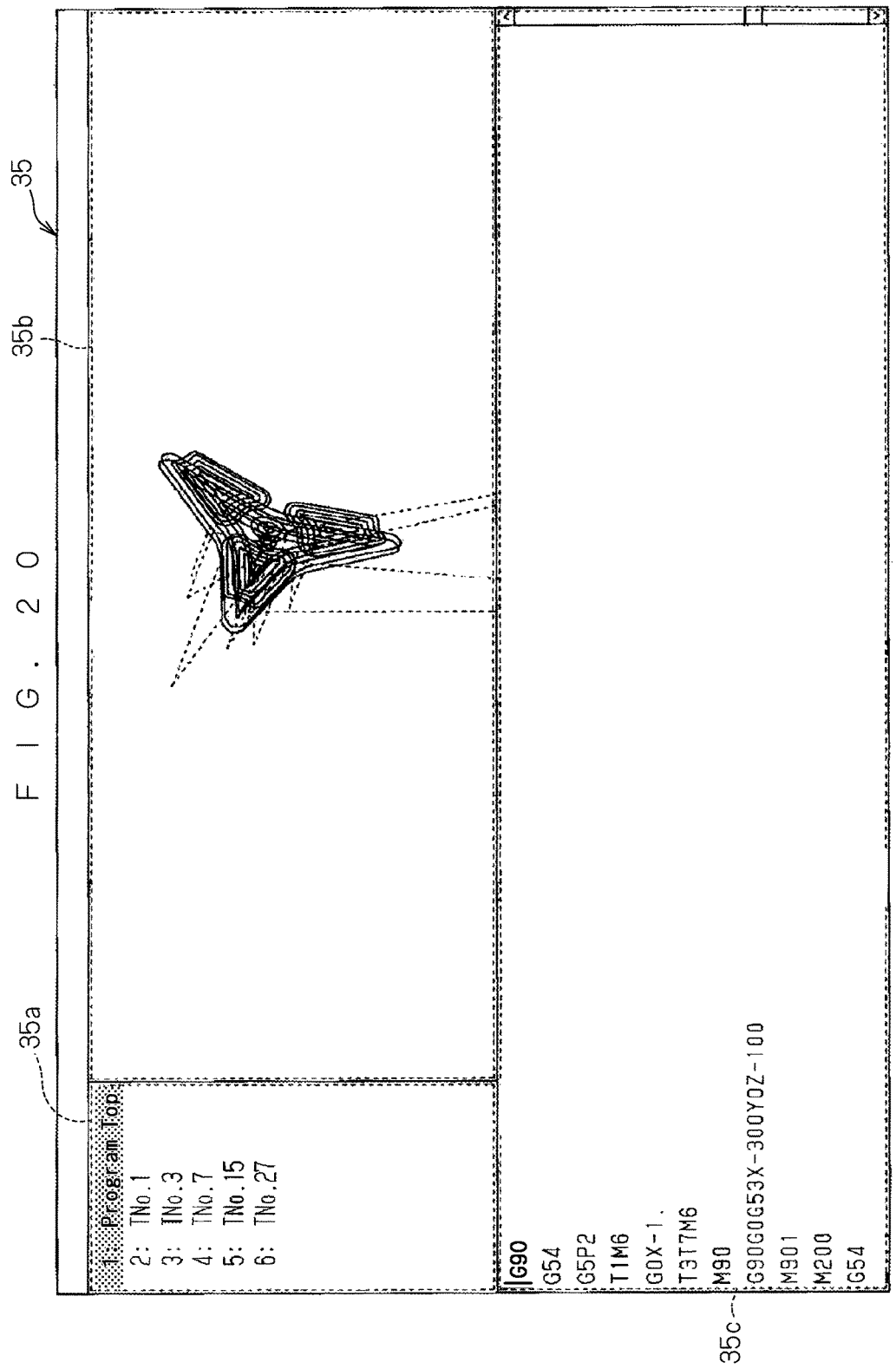
FIG. 20 is a plan view showing an example of the editing assist image according to the second embodiment.

FIG. 20 shows an example of the editing assist image of the present embodiment. As shown in FIG. 20, the machining shape defined by the position of the tool instructed by the program is displayed as the machining shape of the workpiece 10 in the shape display area 35b, drawn by a continuous line. The machining shape of the workpiece 10 is an example of the defined shape. The dashed line in the shape display area 35b represents a tool path when positioning command is executed (this is also referred to as rapid traverse command) and shows an example of defined shapes. It is noted that the continuous lines and the dashed lines shown in FIG. 20 are examples of a connecting line, and in the actual configuration it is assumed that the form of the two types of connecting lines is the same (for example, the continuous line with the same thickness) and the two connecting lines differ in color from each other. In FIG. 20, however, due to the restriction in the expression of the drawings, they are depicted with a continuous line and a dashed line. Furthermore, the display candidates in the program data display area 35c are the data defining the contents of the machining program 40 (detailed data). These data are examples of the program data. That is, the detailed data are the data that define the contents of the machining process in the machining program 40. In the present embodiment, the detailed data include the command codes considered as a separation of the machining process and other codes including all the G-code.

Figure 21:
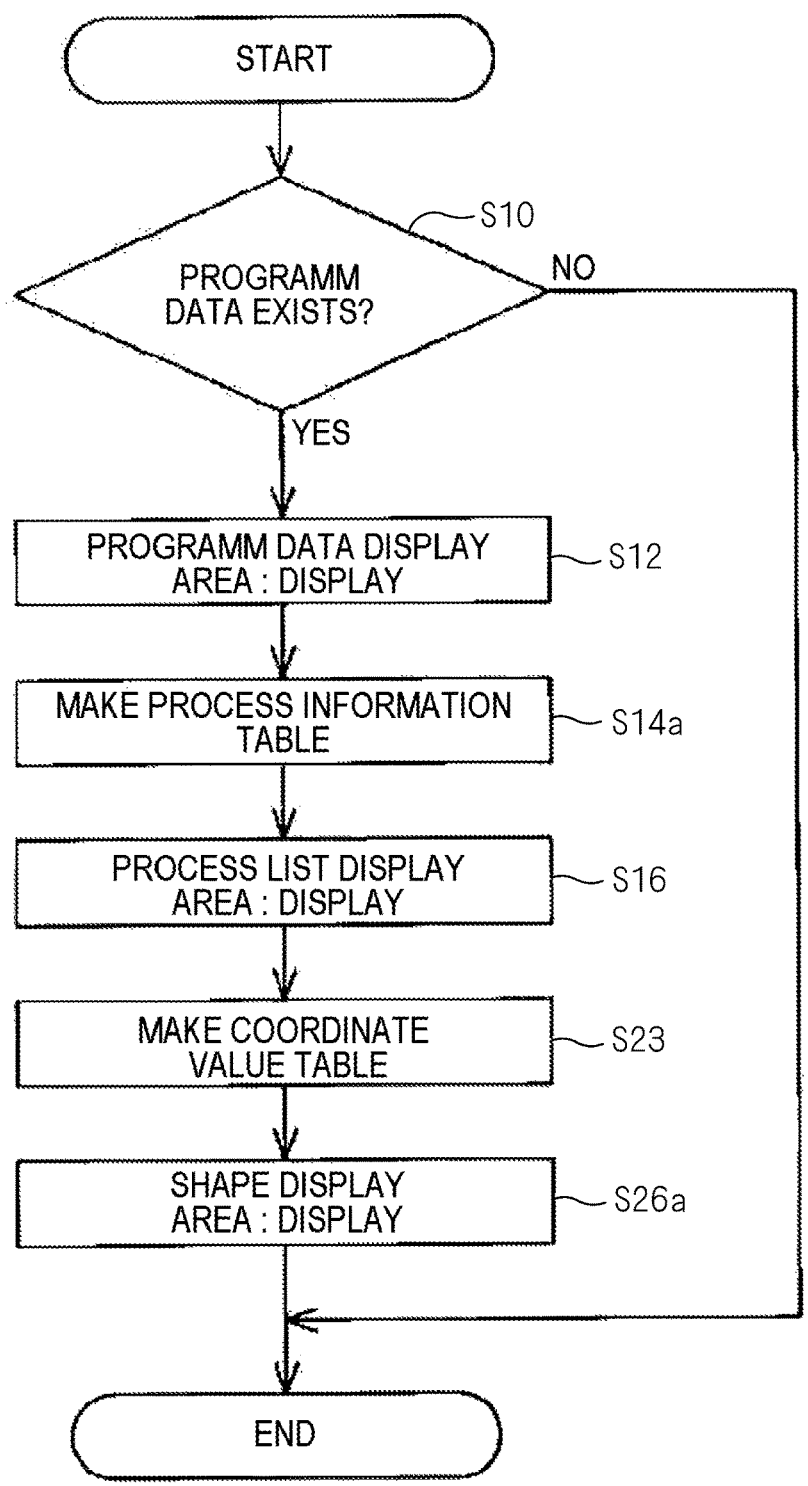
FIG. 21 is a flowchart showing the procedure of the initial display processing according to the second embodiment.

FIG. 21 shows the procedure of the display processing of the editing assist image shown in FIG. 20. In FIG. 21, the processing given the same step number as the step number of FIG. 7 is the same processing as the processing of FIG. 7 in order to omit the explanation for the convenience. The procedure shown in FIG. 21 constitutes the control performed by the display control module.

In the series of this procedure, after the display processing in the program data display area 35c is completed in the step S12, the CPU 32 extracts the T-code from the machining program 40 and creates a process information table in the step S14a. FIG. 22 shows the process information table. In the process information table, the T-code included in the machining program 40 is listed in the ascending order of the row number from the program top (hereinafter referred to as program row number). However, the process number "1" does not have the T-code. This represents the top of the program. It is noted that in the present embodiment, a series of operations performed in the rows from the program row number registered at the process number in the process information table to the row number just before the row number registered at the next process number in the table is referred to as the machining process, collectively. That is, the CPU 32 considers the series of the operations from the program row number having the T-code handled as the process name data to the row number just before the row number having the next T-code handled as the process name data, as the machining process of the former T-code.

In FIG. 21, the CPU 32 makes the display device 34 display character strings indicating the T-code as the machining process in the step S16, based on the process information table. As shown in FIG. 20, the process number "1" is the top of the machining program 40 (Program Top).

Next, in the step S23, the CPU 32 creates a coordinate value table in the memory 38. To create this table, the CPU 32 searches the coordinate value data from the top of the machining program 40, except for the data accompanying G-code relating to the setting of the coordinate system, and extracts the program row number, the type of G-code and the coordinate value data (coordinate value of the instructed position). It is noted that in the case the coordinate value data is not accompanied by the G-code, it is treated as if the last G-code before that is there. Each of the coordinate values in the coordinate value table made as above is the coordinate value of the end position of the G-code or the coordinate value of the position to define the machining shape. Furthermore, on the assumption that the tool path is depicted as a machining shape, the starting point is located at the machine home position.

In FIG. 21, in the step S26a, the CPU 32 displays the machining shape of the workpiece 10 in the shape display area 35b, after making the coordinate value table. In this processing, the CPU 32 first positions all the points, each of which is defined by each coordinate value data from the top row to the end row of the coordinate value table in the 3D virtual space, and connects the points with connecting lines to create a 3D model, then stores the 3D model in the memory 38 as the machining shape model. Then, the CPU 32 converts the above machining shape model to the 2D shape based on the viewpoint set by the operator (projects the machining shape model onto the plane for display). Then, the CPU 32 displays the 2D shape in the shape display area 35b. It is noted that the points and lines in the 3D model or 2D shape do not represent size, therefore the lines do not become thicker even when the shapes are enlarged. Now, the connecting line made by the coordinate value table is explained below. The first connecting line connects the point indicated by the coordinate value data at the top of the coordinate value table and the machine home position as the starting point. After this, the connecting line connects the point defined by the coordinate value data in the table and the point indicated by the data just before the coordinate value data in the table. In other words, it can also be said that a connecting line indicated by a certain row in the coordinate value table is a line that connects the point indicated by the coordinate value data of the certain row and the point indicated by the data of the row just before the certain row, and that ends at the point indicated by the coordinate value data of the row.

The machining shape displayed in the above processing is an example of the defined shape obtained by the machining program. To be exact, it is different from the shape of the machining obtained as a result of the machining, but the machining shape obtained through the simple processing as above is practical enough for the operator to specify the machining portion. In addition, because of the simple processing for making a machining shape model, the above machining program editing assist apparatus considerably saves the time required for processing compared to the conventional tool path display method in which the actual tool path is calculated to be displayed, and is suitable for an assisting function in finding the point to be edited in the machining program. The above machining shape is the display candidate of the shape display area 35b. The machining shape to be displayed can be changed according to the setting of the viewpoint or display magnification for converting the 3D shape model to the 2D shape of the graphic image.

Figure 24:
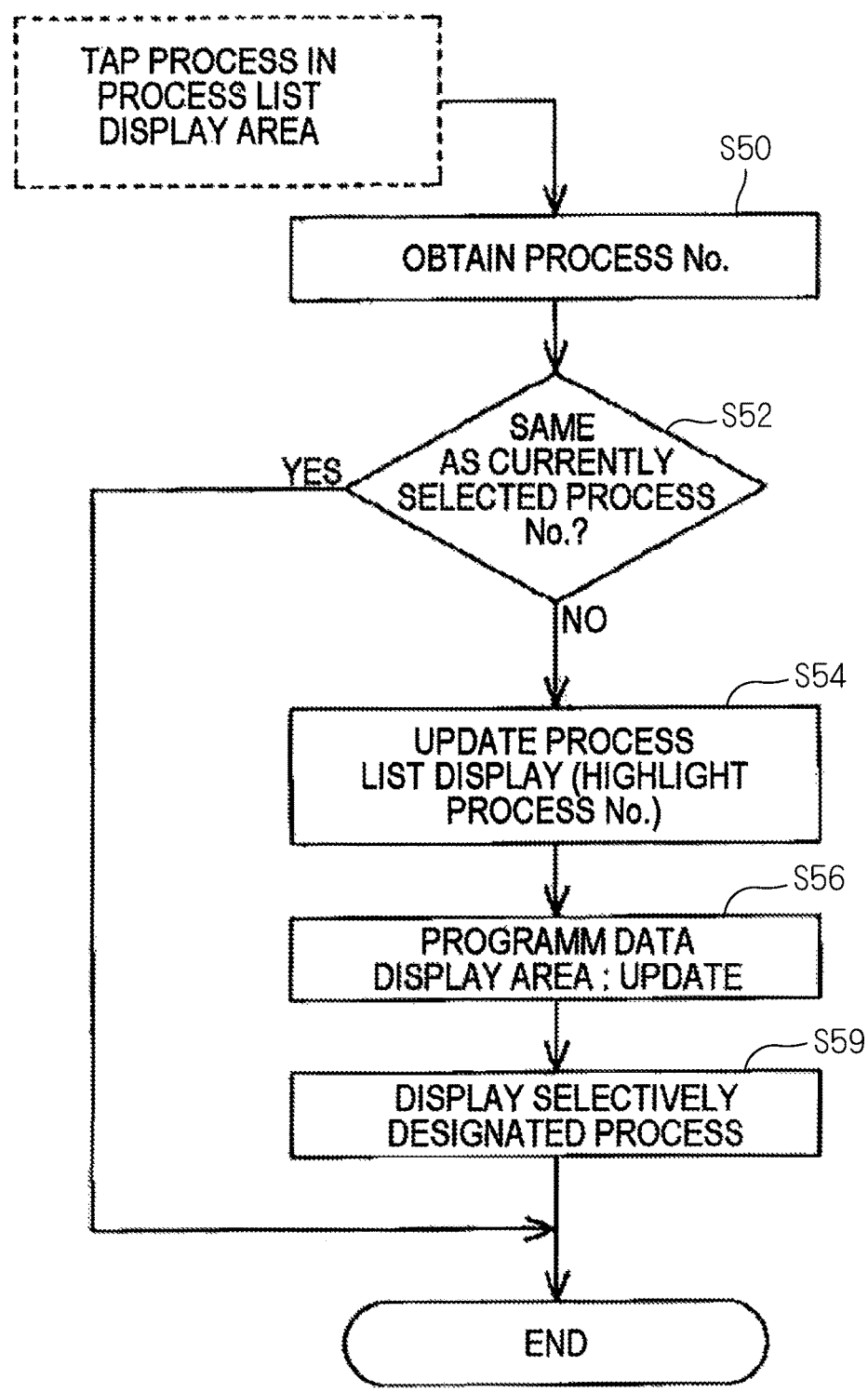
FIG. 24 is a flowchart showing the procedure of the processing when tapping the process list display area according to the second embodiment.

FIG. 24 shows the procedure in the case a specific point in the process list display area 35a is indicated. The procedure shown in FIG. 24 is achieved by the CPU 32 executing the editing assist program 42. The procedure shown in FIG. 24 constitutes the control performed by the display control module. In FIG. 24, the processing which is the same as the processing in FIG. 15 is given the same step number as FIG. 15 in order to omit the explanation for the convenience.

In the procedure shown in FIG. 24, after the processing of the step S56, the CPU 32 displays the machining shapes of the designated machining process selectively as the designated display object in the shape display area 35b (S59).

Figure 25A:
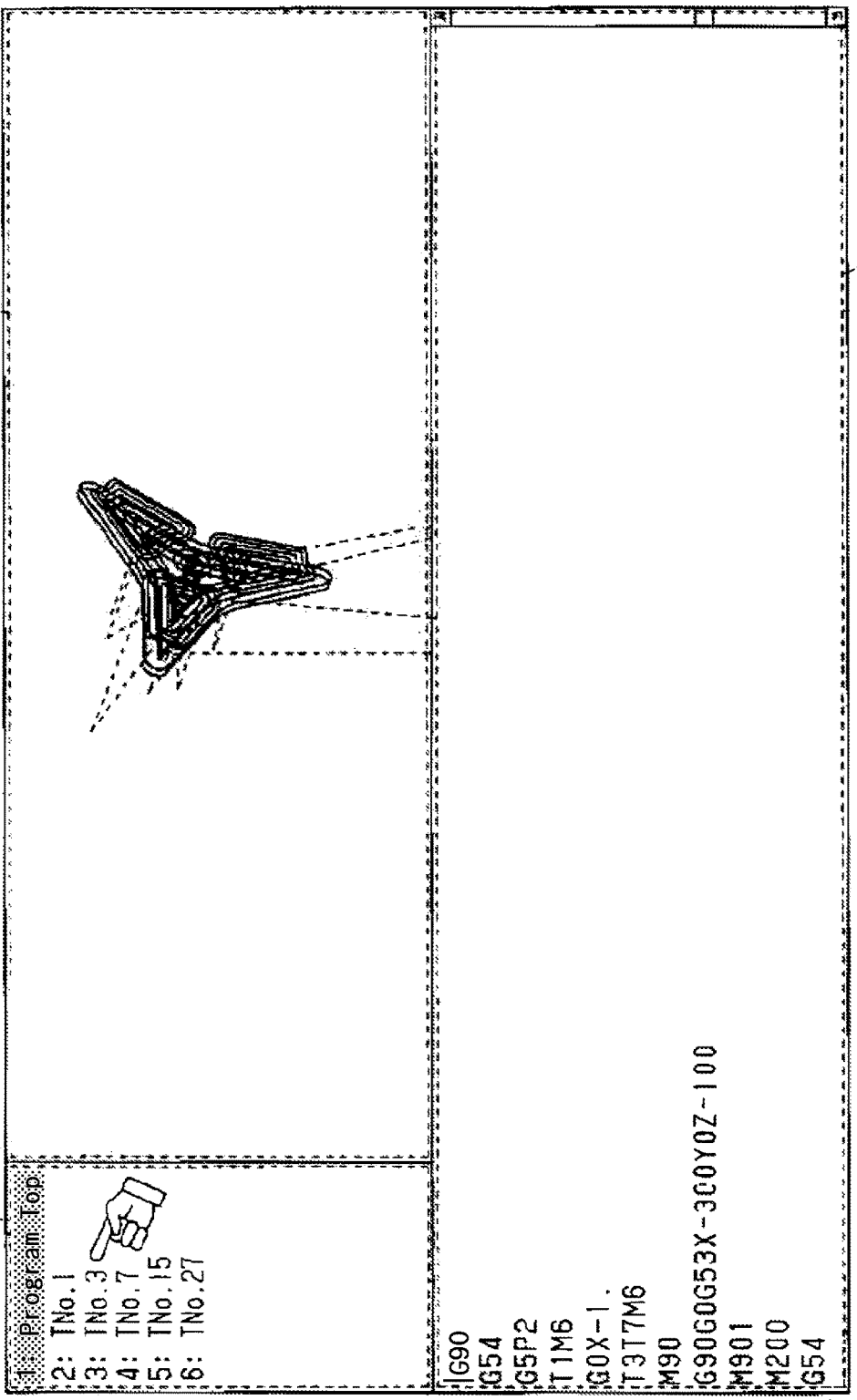

FIG. 25A shows that the machining process "TNo. 3" of the process number "3" is tapped in the process list display area 35a. FIG. 25B shows that only the machining shapes of the machining process "TNo. 3" of the process number "3" are displayed selectively in the shape display area 35b. To describe concretely, first, the CPU 32 clears the display of the shape display area 35b and acquires the starting program row number and the ending row number of the process number "3" from the process information table, and then acquires the data from the starting program row number to the ending row number based on the coordinate value table and displays the machining shape. In this way, the CPU 32 displays the machining shapes of only the process number "3". That is, in the case the operator's designating the machining process displayed in the process list display area 35a makes the CPU 32 decide the machining process, the CPU 32 selects all the program data of the designated machining process and displays the defined shapes of the program data as the designated display objects in the shape display area 35b. This is called all row designating processing. On the other hand, as stated below, in the program data display area 35c, the CPU 32 considers the top row of the program data correspondent to the designated machining process, that is, the row considered as the process name data, as the designated display object. In the case the row is already displayed, the CPU 32 moves the cursor to the row in order to show that the row is the designated display object. This is called only one row designating processing.

It is noted that FIG. 25B shows the detailed data of the machining program 40 displayed as the display objects in the program data display area 35c after the processing of the step S56 has been performed. This is the same as the detailed data of the machining program 40 displayed as the display objects in the program data display area 35c in FIG. 25A. The only difference is that the cursor has moved. This is an example in which displaying the detailed data from the top does not take place because the data defining the selected machining process are being displayed without changing the display of the detailed data of the machining program 40 in the program data display area 35c. By the way, the cursor K is displayed at the row in which "T3T7M6" is described. In this explanation, the T-code "T3" on the left is the tool data to be used for the machining this time and the T-code "T7" on the right is the tool data to be used for the machining next time. There is a row beginning with "T7", which will come after in the machining program 40. This row declares the tool of the T-code "T7" to be used for the machining. It is noted that in FIG. 25B, moving the cursor K to the data of "T3T7M6" shows that this data has become the designated display object.

Figure 26A:
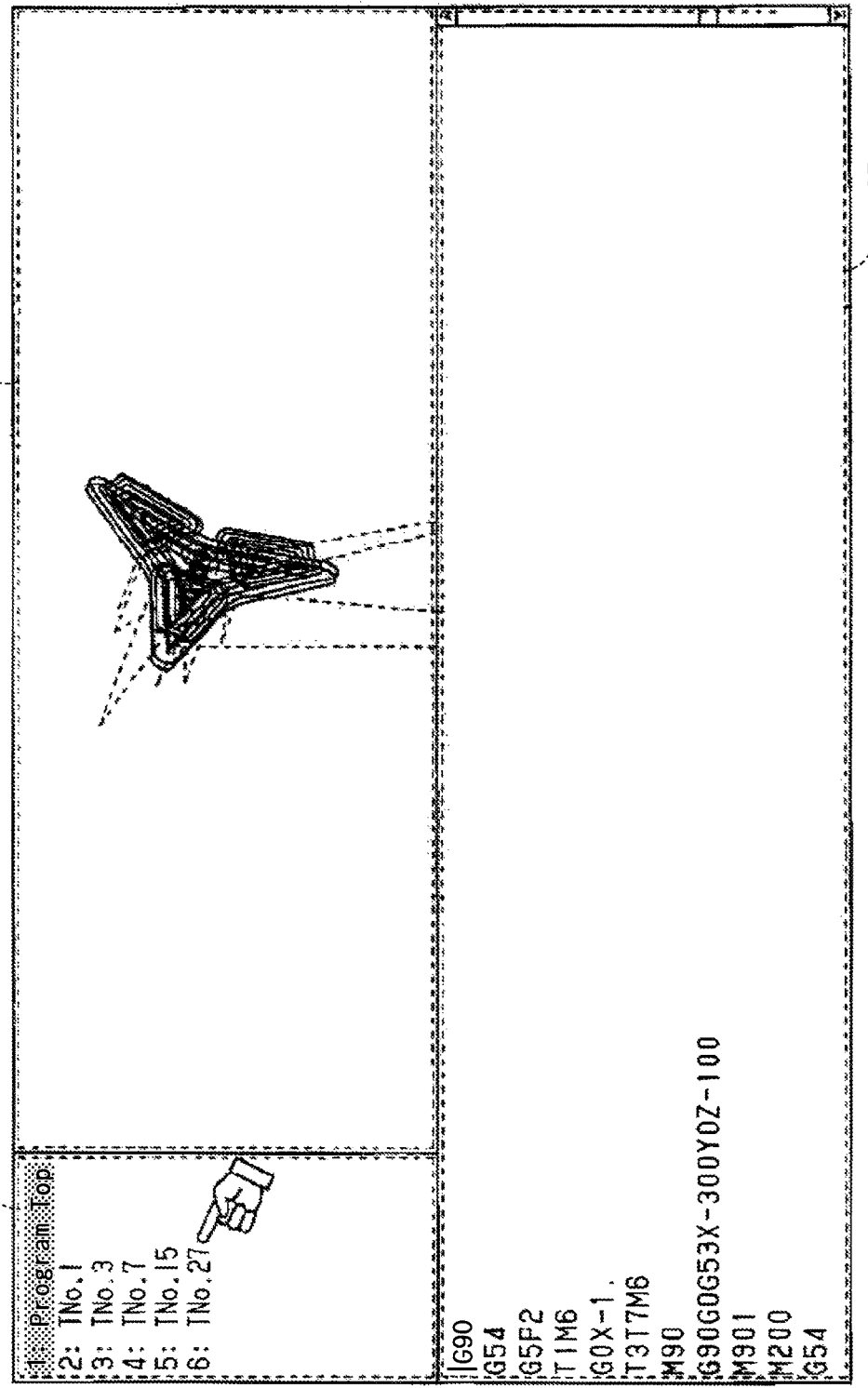
FIGS. 26A and 26B are views showing the processing when tapping the process list display area according to the second embodiment.
Figure 26B:
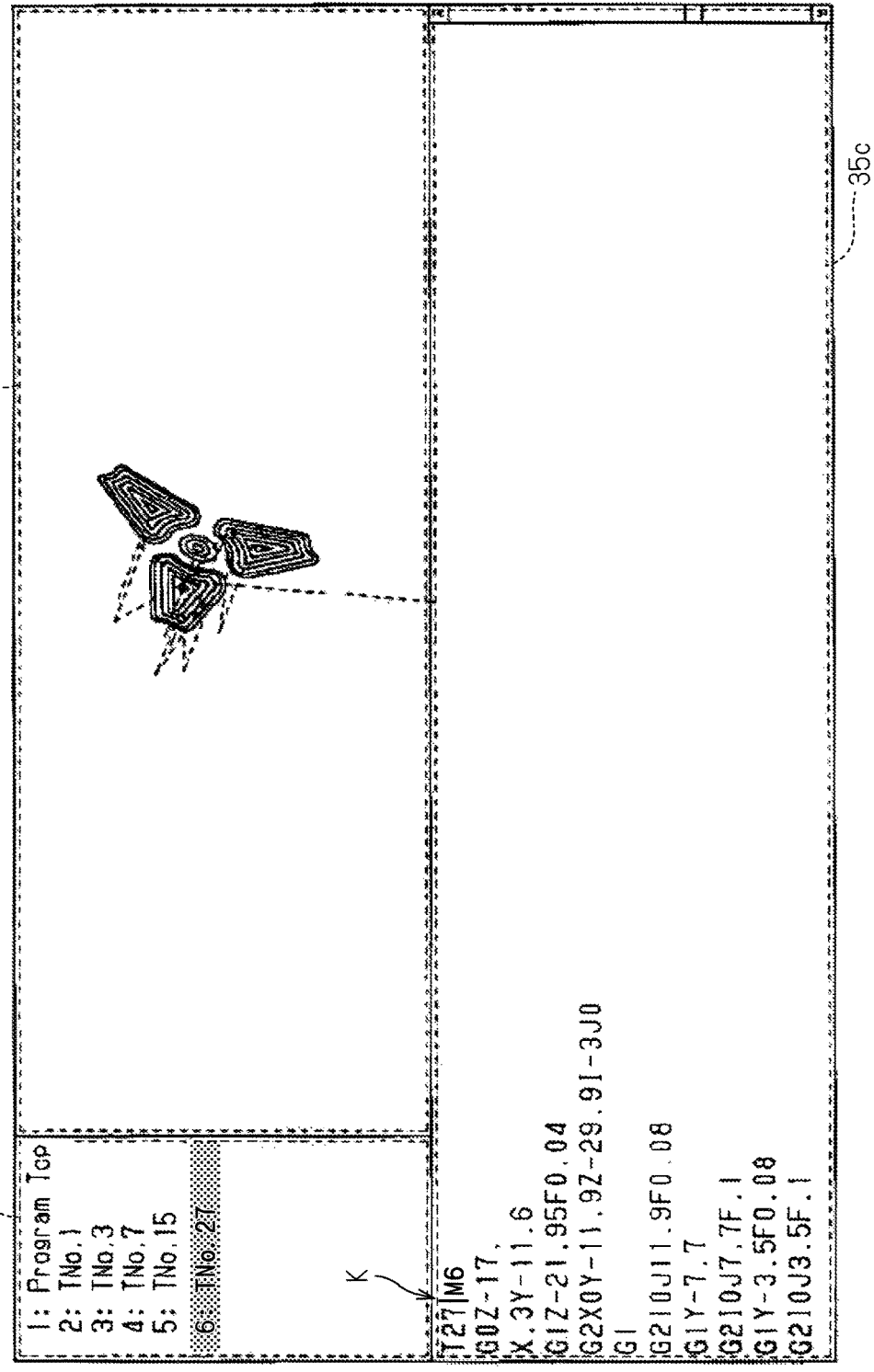

FIG. 26A shows that the machining process "TNo. 27" of the process number "6" displayed in the process list display area 35a is tapped. FIG. 26B shows that only the machining shape of the machining process "TNo. 27" of the process number "6" is displayed selectively as the designated display object in the shape display area 35b. In this case, the detailed data of the program displayed in the program data display area 35c in FIG. 26B are different from the detailed data of the program displayed in the program data display area 35c in FIG. 26A as a result of displaying the data from the top.

According to the procedure of FIG. 24, tapping one of the machining processes displayed in the process list display area 35a allows the operator to immediately know the machining shape of the designated machining process by means of the image displayed in the shape display area 35b. This also allows the operator to know the data that define the machining process immediately by means of the detailed data of the machining program 40 displayed in the program data display area 35c. It is noted that in the explanation of FIG. 25 and FIG. 26, in both cases, first, in a state the machining shapes of the machining process to be designated are being displayed, the machining process is designated and then, the display objects other than the designated display objects disappear and only the designated display objects are displayed. On the contrary, in a state the machining shapes of the machining process to be designated are not being displayed, which is caused for the reason that, for example, the operator has changed the viewpoint for converting the graphic image to the 2D shape, the display magnification of the designated display objects is decided according to the size of the shape display area 35b and the parallel translation of the viewpoint is performed so as to display the designated display objects in the center of the shape display area 35b.

Figure 27:
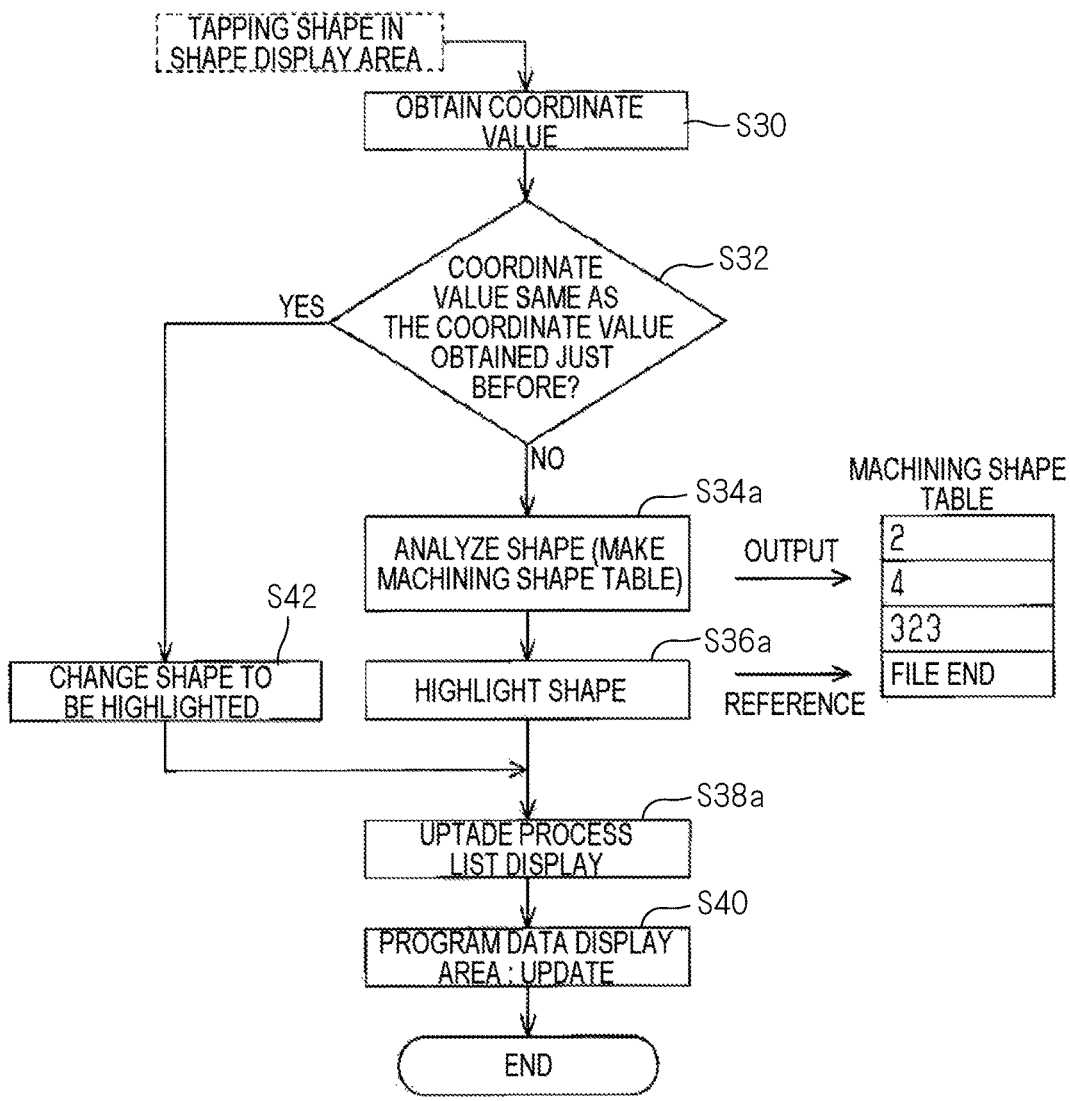
FIG. 27 is a flowchart showing the procedure when tapping the shape display area according to the second embodiment.

FIG. 27 shows the procedure in the case the specific point in the shape display area 35b is indicated. The procedure shown in FIG. 27 is achieved by the CPU 32 executing the editing assist program 42. The procedure shown in FIG. 27 constitutes the control performed by the display control module. In FIG. 27, the processing which is the same as the processing in FIG. 12 is given the same step number as FIG. 12 in order to omit the explanation for the convenience.

As shown in FIG. 27, the CPU 32 creates the machining shape table in the step S34a. That is, when a specific point is tapped in the shape display area 35b, in regard to the 2D machining shape model displayed in the shape display area 35b, the CPU 32 extracts the lines that pass through within the area of a circle having a certain radius that is centered at the indicated point based on the output value from the touch panel 36. In the present embodiment the machining shape displayed in the shape display area 35b is a line, therefore this is a processing to consider any point in the area of this circle as a specific point. Then, the CPU 32 obtains the program row number of the row in which the extracted line is defined, based on the coordinate value table shown in FIG. 23. Then, listing the obtained program row numbers creates the machining shape table. It is noted that, when the line is displayed in the shape display area 35b, the displayed line and the program row number may be stored as a set on the memory 38, instead of the coordinate value table. This allows the program row number to be obtained more quickly.

Then, in the step S36a, the CPU 32 makes the display device 34 highlight the machining shape (connecting line) defined by the first data of the program row numbers listed in the machining shape table, that is, the machining shape (connecting line) registered at the top of the machining shape table, as the designated display object, in the shape display area 35b. That is, the CPU 32 changes the color of only the designated line or makes the line thick. Next, in the step S38a, the CPU 32 searches the machining process correspondent to the program row number based on the process information table and makes the display device 34 highlight the character string of the process number of the obtained machining process as the designated display object in the process list display area 35a. Furthermore, in the step S40, based on the process information table, the CPU 32 makes the display device 34 display the corresponding detailed data of the program from the top as the designated display object in the program data display area 35c and move the cursor to the row, that is, the row which is indicated by the program row number of the machining shape table adopted as the designated display object of the shape display area 35b.

According to the procedure shown in FIG. 27, when the operator feels something strange of the machining shape displayed in the shape display area 35b, tapping the strange point allows him to grasp immediately the location of the machining process having the strange shape in the entire machining processes by means of highlighting the machining process in the process list display area 35a. In addition, the detailed data of the machining program 40 displayed from the top in the program data display area 35c allow the operator to know the contents of the program, immediately. Moreover, when multiple tools machine the same area of the workpiece repeatedly, the machining shapes are entangled, and it is sometimes difficult for the operator to know which tool machines which machining shape. Even in this case, tapping the process number or tool name in the process list display area 35a in order to display the machining shape of the tapped machining process only and then tapping the shape display area 35b allows the operator to find the target machining shape quickly.

Figure 28:
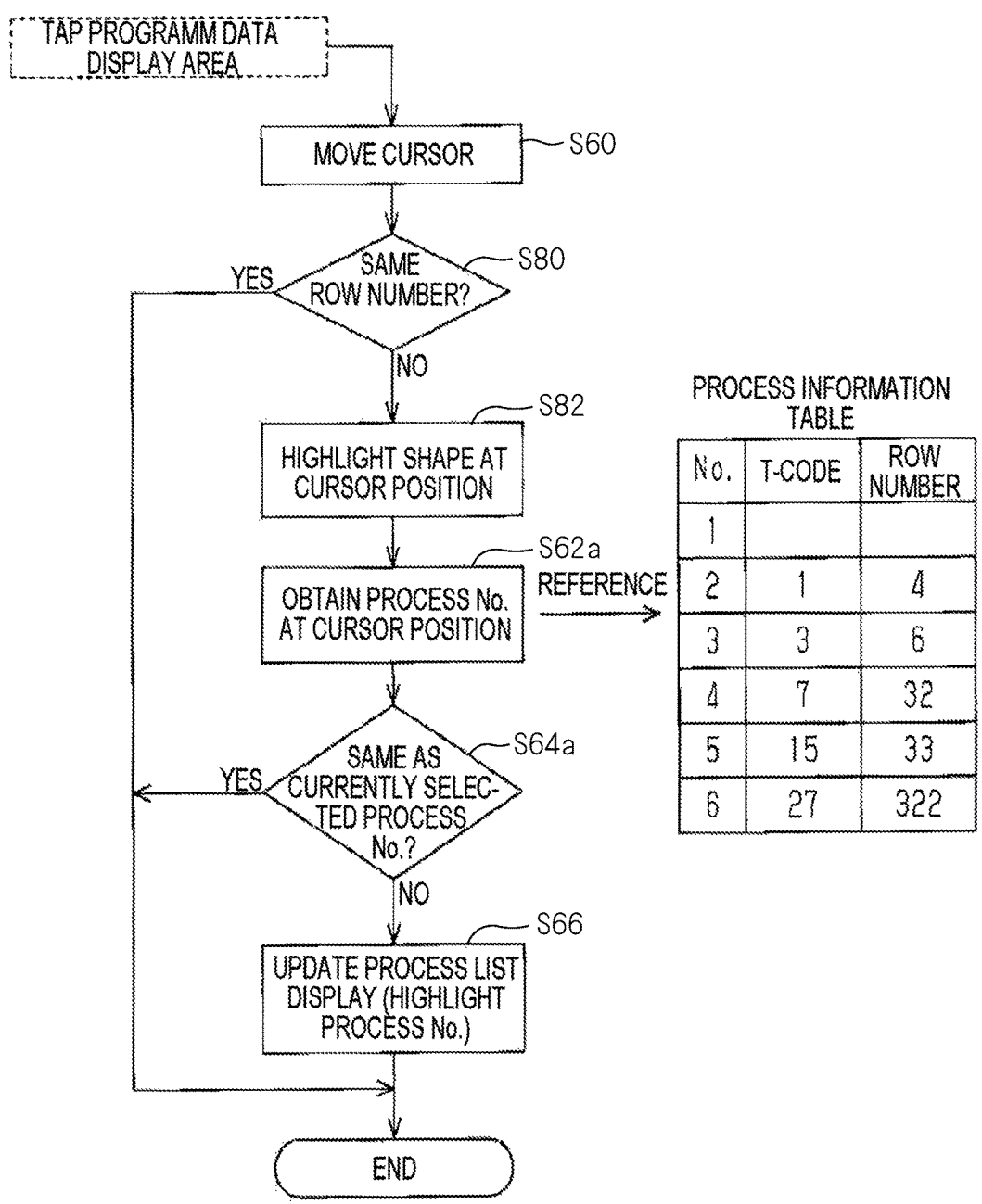
FIG. 28 is a flowchart showing the procedure of the processing when tapping the program data display area according to the second embodiment.

FIG. 28 shows the procedure in the case a specific point in the program data display area 35c is indicated. The procedure shown in FIG. 28 is achieved by the CPU 32 executing the editing assist program 42. This procedure constitutes the control performed by the display control module. In FIG. 28, the processing which is the same as the processing in FIG. 16 is given the same step number as FIG. 16 in order to omit the explanation for the convenience.

When the processing of the step S60 is completed, in the step S80 the CPU 32 judges whether the program row number at which the cursor is located is the same as before. In the case of judging that the cursor has moved to a different program row number (S80: NO), the CPU 32 highlights the machining shape (connecting line) defined by the program row number at which the cursor is located as the designated display object in the shape display area 35b (S82). Next, the CPU 32 obtains the process number correspondent to the program row number at which the cursor is located (S62a) based on the process information table. That is, the process number can be obtained based on the starting program row number of each machining process registered in the process information table. For example, in the case the cursor is located at the program row number "8", it is larger than the program row number "6" of the process number "3" and is smaller than the program row number "32" of the process number "4". In this way, the process number is concluded to be "3".

Then, the CPU 32 judges whether the process number determined in the step S62a is the same as the process number currently selected in the process list display area 35a (S64a). When it judges it is not a process number currently selected (S64a: NO), the display of the process list display area 35a is updated (S66).

According to the procedure in FIG. 28, the operator's tapping the character string of any data of the detailed data of the machining program 40 displayed in the program data display area 35c highlights the corresponding machining process in the process list display area 35a. This allows the operator to know the location of the machining process of the above data in the entire machining processes, immediately. Moreover, highlighting in the shape display area 35b allows the operator to grasp the machining shape defined by the above data, immediately.

A Third Embodiment

A third embodiment of the machining program editing assist apparatus will be described with reference to the drawings below, mainly about the differences from the second embodiment.

In the above second embodiment, the T-code was designated in advance as the separation of the machining process displayed in the process list display area 35a. On the contrary, the machining program editing assist apparatus of the present embodiment enables the operator to designate several codes as the separation of the machining process. That is, the machining program editing assist apparatus considers a specific command code to be used for the separation of the machining process as a machining process extracting code and enables the operator to designate the machining process extracting code, in the machining program conforming to the EIA/ISO standard. In other words, the display control module provided in the machining program editing assist apparatus accepts at least one command code to be used as the separation of the machining process via the input device and considers the accepted specific command code as a machining process extracting code and handles the machining process extracting code as the process name data.

FIG. 29 shows an example of designating of the machining process of the present embodiment.

On the right side of FIG. 29, the machining program 40 of the present embodiment is shown. The machining program 40 of the present embodiment also conforms to the EIA/ISO standard. In the present embodiment, however, the machining program 40 has parentheses and a comment is put in them. In the present embodiment, this is referred to as a comment command code CC. The comment command code CC takes no effects on the instruction signal that is output from the numerical control device 30 in order to make the composite machining machine 20 work. The comments may be arbitrarily described by the operator.

FIG. 29 shows an example in which the tool change command code is used as the machining process extracting code. In this figure, the tool change command code is a code to command the tool change. This is usually a T-code. This example, however, shows that in the present embodiment, instead of putting two T-codes side-by-side, a T-code and a M-code are used in a set. The tool to be mounted into the spindle actually by the automatic tool change is described with "T**M06: * is an arbitrary number". The tool to be prepared for change is described with "T**M##: ## is a number other than 06". In the present embodiment, the T-code commanded together with "M06" is handled as a machining process.

FIG. 29 shows another example in which the tool change command code and a coordinate system designation code are used as the machining process extracting codes. The coordinate system designation code is a command code to designate the coordinate system, practically, it is the code "G54 to G59". In this explanation, these codes "G54 to G59" are used when multiple workpieces are machined in the only one machining program 40. In this case, the codes "G54 to G59" allow the operator to know the workpiece to be machined in the machining process.

FIG. 29 shows one more example in which the comment command code CC is used as the machining process extracting code. The comment command code CC is for describing the operator's arbitrary comment. Therefore, handling the code as the machining process extracting code allows the operator to make easier-to-understand expressions, and this enables the operator to know the contents of the machining easily and to find the target machining process immediately. Now, in the present embodiment, the comment command code CC is included in the display candidates of the program data display area 35c.

Figure 30:
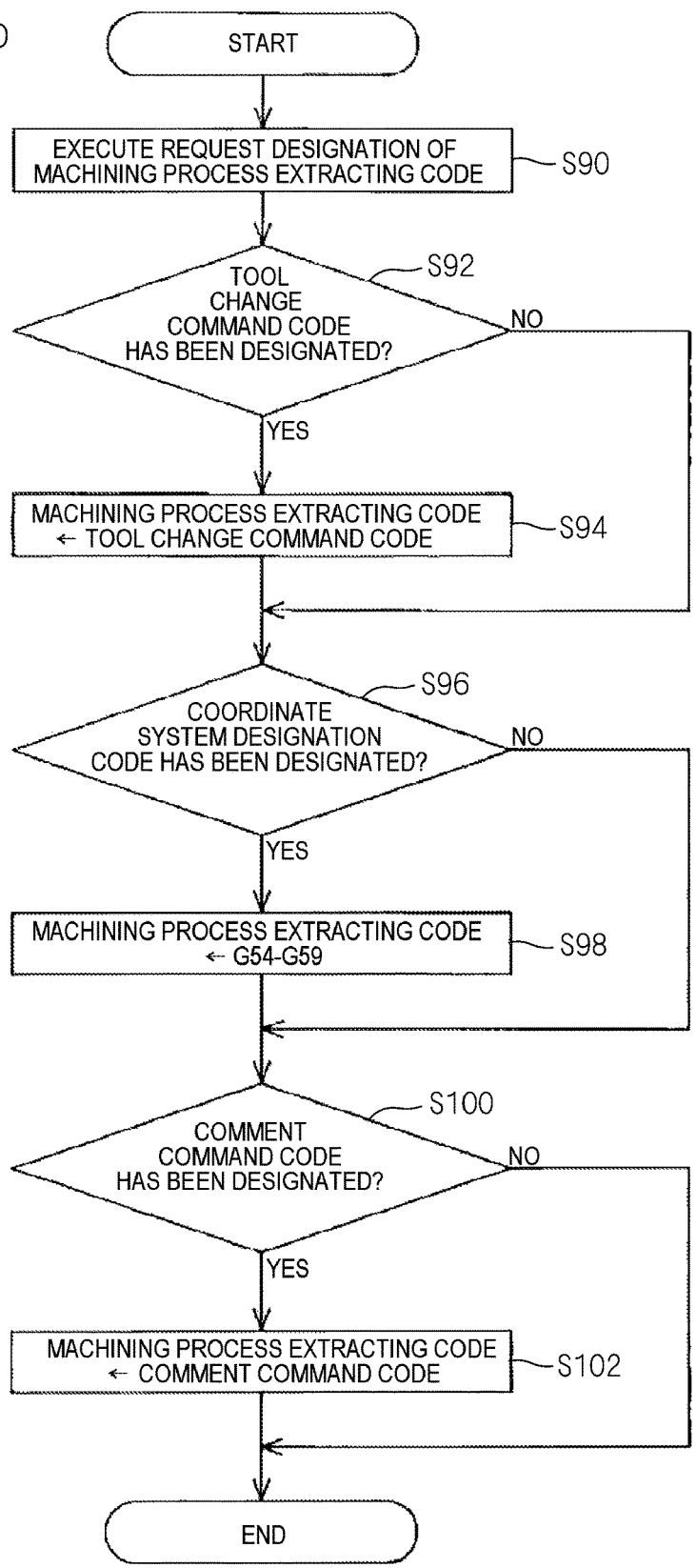
FIG. 30 is a flowchart showing the procedure of the processing of selecting a title of the machining process according to the third embodiment.

FIG. 30 shows the procedure of designating the machining process extracting code related to the present embodiment. This procedure is achieved by the CPU 32 executing the editing assist program 42.

In the series of the procedure shown in FIG. 30, the CPU 32 first executes the processing to request designating of the machining process extracting code, which requests the operator to designate the machining process extracting code (S90). To describe concretely, for example, a message like "Please select the code to be handled as a machining process". is displayed and two character strings, "Select" and "Not Select", are put side by side, for each of the tool change command code, coordinate system designation code and comment command code CC, on the screen 35 of the display device 34. Then, for example, if the operator wants to handle the tool change command code and the coordinate system designation code as the machining process extracting code, he may tap the area of the character string "Select" for the tool change command code and for the coordinate system designation code and taps "Not select" for the comment command code.

When the CPU 32 judges that the operator has finished designating the code by means of the output value from the touch panel 36, etc., it judges whether the tool change command code has been designated (S92). When the CPU 32 judges that the tool change command code has been designated (S92: YES), the CPU 32 registers the tool change command code as the machining process extracting code (S94).

When the CPU 32 completes the processing of the step S94 or judges "NO" in the step S92, it judges whether the coordinate system designation code has been designated (S96). When the CPU 32 judges that the coordinate system designation code has been designated (S96: YES), it registers "G54 to G59" as the machining process extracting code (S98).

When the CPU 32 completes the processing of the step S98 or judges "NO" in the step S96, it judges whether the comment command code has been designated (S100). When the CPU 32 judges that the comment command code has been designated (S100: YES), it registers the comment command code as the machining process extracting code (S102).

When the CPU 32 completes the processing of the step S102 or judges "NO" in the step S100, the CPU 32 ends the series of this procedure.

After the CPU 32 has decided the machining process extracting code, the CPU 32 extracts the machining process from the machining program 40 and creates the process information table in the processing of the step S14a in FIG. 21. It is noted that, for example, the process information table related to the present embodiment may be a table in which the correspondence between the process number and the program row number is obvious and T-code is not registered. In this case, the CPU 32 may extract the machining process from the machining program 40, based on the program row number registered in the process information table, for creating the image data to be displayed in the process list display area 35a in the step S16. In this case, the image of the character string of the extracted machining process may be displayed in the process list display area 35a. However, the process information table may be a table in which the correspondence among the process number, the machining process and the program row number is obvious.

Other Embodiments

Each of the above embodiments may be changed and performed, as follows;

"Regarding a Method of Displaying the Designated Display Object"

Some figures, such as FIGS. 13 and 16, show an example of the method where the color of the image of the designated display object is changed and the brightness is heightened in the process list display area 35a. However, the method of displaying the designated display object is not limited to this. For example, the brightness may be heightened while keeping the color unchanged, or, for example, the color may be changed while keeping the brightness unchanged. In addition, for example, the cursor may be displayed near the designated display object.

In some figures, such as FIGS. 13, 14, 24 and 26, in the program data display area 35c, the designated display objects are displayed from the top and the cursor K is moved to a specific point on it. But, the method of displaying the cursor K is not limited to this. For example, at the timing immediately after the designated display objects are displayed from the top, it is not necessary to define the location of the cursor K or to display the cursor K. In this case, for example, by tapping the image, etc. of the specified character string in the program data display area 35c, the cursor K may be appeared on that point.

In FIGS. 13, 16, 27 and 28, in the case the machining process to be highlighted is not displayed in the machining processes displayed in the process list display area 35a, displaying the machining process from the top may be executed and highlighted.

In FIG. 13, the machining shape is highlighted in the shape display area 35b, but the method of displaying the designated display object is not limited to this. For example, a different color may be applied to the machining shape instead of highlighting the machining shape. In addition, an arrow indicating the highlighted area may be displayed along with the highlighting of the machining shape. Moreover, only an arrow may be displayed without highlighting the machining shape.

In FIGS. 15 and 16, when a machining process is designated, the CPU 32 highlights the machining shape machined by the machining process in the shape display area 35b, but the method of displaying the designated display object is not limited to this. For example, only the machining shape that is the designated display object may be displayed with a continuous line and the rest may be displayed with a dashed line.

"Regarding the Division of the Display Area"

In the above embodiments, the size and the layout position of each area of the process list display area 35a, the shape display area 35b and the program data display area 35c are fixed. However, the method of dividing the display area is not limited to this. For example, the specific area may be enlarged or reduced by the pinch out or pinch in operation on the touch panel 36. Thus, for example, giving an instruction to enlarge the process list display area 35a and the shape display area 35b in such a way that these display areas are enlarged toward the bottom of FIG. 6 reduces the program data display area 35c and enlarges the process list display area 35a and shape display area 35b.

In this case, it is not essential that the process list display area 35a, the shape display area 35b and the program data display area 35c are all displayed on the screen 35 all the time. For example, it may be possible that the visible part of the program data display area 35c is reduced because of the enlarged process list display area 35a and the shape display area 35b. Even in this case, redisplaying the program data display area 35c as needed allows the operator to grasp the correspondence among the information displayed on each display area.

"Regarding the Machining Process Extracting Code"

In regard to each of the tool change command code, the coordinate system designation code and the comment command code, deciding whether to adopt it as a separation of the machining process is not limited to the instruction from the operator. For example, one of the tool change command code and the coordinate system designation code may be considered as the separation of the machining process due to the instruction from the operator. In addition, for example, one of the coordinate system designation code and the comment command code may be considered as the separation of the machining process due to the instruction from the operator. Furthermore, for example, one of the tool change command code and the comment command code may be considered as the separation of the machining process on the instruction of the operator.

Furthermore, each of at least one of the tool change command code, the coordinate system designation code and the comment command code and each of the codes other than these three codes may be defined as a separation of the machining process due to the instruction from the operator.

The method of setting a code as the separation of the machining process is not limited to the method of listing some codes as candidates in advance. For example, the operator may enter a code to be regarded as the separation of the machining process and the entered code may be defined as the separation of the machining process.

"How to Display the Shape Based on the Shape Instruction Code (G-Code)"

In the above second and third embodiments, regarding the machining shapes displayed in the shape display area 35b, only the example in which the colors are different between the tool path when the tool runs on the workpiece 10 and the tool path when the tool runs off the workpiece 10 is shown, except for the designated area. But, the method of displaying the shapes is not limited to this. For example, different colors may be applied to the tool path when the tool runs on the workpiece 10 according to the type of G-code. Of course, it is not limited to applying different colors based only on the type of G-code. For example, different colors may be applied according to the tool used based on T-code.

"Regarding the Method of Making the Data of Machining Shape Images"

In the above first embodiment, the machining shape to be displayed in the shape display area 35b is made based on the difference set of the shapes (coordinate value information) defined by the shape sequence data (FIG). Moreover, in the second embodiment, the machining shape data is made by connecting the points in a space indicated by multiple coordinate value data defined in the machining program 40 with the line having attributes defined by G-code. However, the method of making the machining shape image is not limited to the methods based on the difference set or the procedure of connecting by line, as stated above. For example, the data made through the simulation of machining the workpiece 10 that is executed by converting the machining program 40 into the codes to be used for the numerical control device 30 may be regarded as the data of the machining shape to be displayed in the shape display area 35b. In this case, storing the data of the end of each machining process of the simulation results allows the image of the machining shape of each machining process to be displayed in the shape display area 35b.

"Regarding the Machining Program"

The machining program having the machining shape data including the machining shape information of the machined workpiece is not limited to the data shown in FIG. 2 and FIG. 3. For example, concerning the point machining, line machining and face machining, the machining program may have the multiple units defining the machining shapes independent of the tools and have the data (units) defining the tools that can be combined with the above units, separately. In this case, describing the unit defining the tool after the unit defining the machining shape can make the machining program.

"Regarding the Program Editing Assist Apparatus"

The program editing assist apparatus is not limited to the CPU 32 executing the editing assist program 42. For example, in the above embodiments, at least a part of the functions achieved by the CPU 32 executing the editing assist program 42 may be achieved by means of a dedicated hardware.

"Regarding the Device on which the Editing Assist Program is Installed"

The device on which the editing assist program is installed is not limited to the numerical control device 30. For example, the program may be installed on a general-purpose computer.

"Regarding the Machine Tool"

The composite machining machine is not limited to the machine shown in the above embodiments. For example, the composite machining machine may have a function for cutting the workpiece 10 by rotating the workpiece 10, such as turning lathe, but without a function for cutting the fixed workpiece 10 by rotating a tool, such as a milling machine.

"Regarding the Input Device"

The input device is not limited to the device with the touch panel 36. For example, the input device may be a device that can indicate a specific point in the display area, such as a mouse. In this case, the specific point is not limited to the point. It may be an area having width. However, in this case, when a specific point is designated in the process list display area 35*a* or in the program data display area 35*c*, it is desirable to regard that the image of the machining process or of the data including a part of the specific point has been designated.

Aspect 1: A machining program editing assist apparatus for assisting in editing a machining program of a machine tool, including: a display device; an input device for indicating an arbitrary point on a screen of the display device; and a display control module for dividing the screen into at least two display areas, including a program data display area and a process list display area, and displaying data in the display areas, the machining program having program data including data that include a separation of a machining process, the program data including: machining method data defining the method of machining of each machining process; and shape definition data defining the shape related to the machining of each machining process, the machining method data including process name data meaning the process name of the machining process correspondent to the machining method data, characterized in that the display control module is configured to consider the program data as display candidates of the program data display area, and display at least a part of the program data as display objects in the program data display area, the display control module is configured to consider the process name data as display candidates of the process list display area and display at least a part of the process name data as display objects in the process list display area, while the display objects are being displayed in either one of the program data display area and the process list display area, and when a specific point is indicated in the one of the display areas via the input device, the display control module is configured to decide that a designated display object of the one of the display areas is the display object designated by the display objects of the one of the display areas and the specific point, and differentiate the designated display object from the other display objects in the one of the display areas, and, the display control module is configured to decide that a designated display object of the other of the display areas is the display candidate of the other of the display areas, which corresponds to the designated display object of the one of the display areas, include the designated display object in the display objects of the other of the display areas, and differentiate the designated display object from the other display objects in the other of the display areas.

In the above device, the display control module performs at least one of the processings below.

(a) While the display objects are being displayed in the program data display area, when a specific point is indicated in the program data display area via the input device, the display control module considers the program data designated by the display objects displayed in the program data display area and the specific point as the designated display object of the program data display area and differentiates the designated display object from the other display objects. In addition, the display control module considers the process name data correspondent to the program data as the designated display object of the process list display area and differentiates the designated display object from the other display objects.

(b) While the display objects are being displayed in the process list display area, when a specific point is indicated in the process list display area via the input device, the display control module considers the process name data designated by the display objects displayed in the process list display area and the specific point as the designated display object and differentiates the designated display object from the other display objects. In addition, the display control module considers the program data correspondent to the process name data as the designated display object of the program data display area and differentiates the designated display object from the other display objects.

According to the above processing (a), when the operator feels something strange in the program data displayed in the program data display area, by indicating a specific point on the strange data, the process name data correspondent to the strange program data is considered as the designated display object and is differentiated in the process list display area. This allows the operator to know which process is the machining process defined by the strange program data in the entire machining processes, immediately. Moreover, according to the above processing (b), when the operator wants to know the program data correspondent to a certain process name data displayed in the process list display area, by indicating the process name data, the program data correspondent to the process name data is differentiated in the program data display area. This allows the operator to know the program data correspondent to the desired process name data, immediately.

In this way, according to the above device, the correspondence between the data that define the machining process and the machining process can be grasped immediately. In particular, in the case the program data are long, only a part of the machining program is displayed in the program data display area, which makes it difficult to know the entire machining. However, according to the above device, the operator can grasp the outline of the machining based on the flow of the machining processes displayed in the process list display area and check the details of the machining process in the program data display area. This allows the operator to find the target point to edit or to check the contents of the machining program in a short time.

Aspect 2: The machining program editing assist apparatus according to the aspect 1, wherein the machining method data include a tool change command code for designating a tool to perform machining, a coordinate system designation code for designating a coordinate system, and a comment command code for putting a comment having no effects on machining in the program data, the shape definition data include a shape instruction code for defining a tool path, the machining program describes the machining method data and the shape definition data in each row in order of performance, characterized in that the display control module is configured to consider at least one of the tool change command code, the coordinate system designation code and the comment command code as the process name data, and consider the data from the row including the command code considered as the process name data in the machining program to the row just before the row including the command code considered as next process name data as the data of the machining process of former process name data.

The command code to designate the tool to perform machining and the command code to designate the coordinate system based on which the machining shape is defined are data that are always included in the machining program. In the above configuration, even in the case that the dedicated data for the separation of the machining process is not in the machining program, the machining process list can be displayed by considering at least one of these command codes as the separation of the machining process.

For example, in the case that the above tool change command code is used as the separation of the machining process, each of the machining processes is displayed every exchange of tools. This allows the operator to know the tool to be used in each of the machining processes based on the machining processes displayed in the process list display area.

For example, when the machining processes of the multiple workpieces are described in a single machining program, the above coordinate system designation code is used in order to set the coordinate system by workpiece. In this case, when the coordinate system designation code is used as the machining process, the machining process displayed in the process display area enables the operator to know which workpiece is machined in each of the machining processes, easily.

The above comment command code is used to be inserted in the machining program at the discretion of the operator. Therefore, in the case the comment command code is used as the separation of the machining process, putting a comment in an easy-to-understand manner as the machining process in the program data by the operator enables the operator to find the portion of the machining program to be edited in an easy-to-understand way and quickly.

Aspect 3: The machining program editing assist apparatus according to the aspect 1, wherein the machining program is a program that is described with command codes prescribed in EIA/ISO standard in each row in order of performance, characterized in that the display control module is configured to accept via the input device an instruction that at least one specified command code should be handled as the separation of the machining process, consider the accepted specified command code as a machining process extracting code, consider the machining process extracting code as the process name data, and consider the data from the row including the command code considered as the process name data in the machining program to the row just before the row including the command code considered as next process name data as the data of the machining process of former process name data.

In the machining programs conforming to the EIA/ISO standard, there are hardly codes to declare the machining process. On the other hand, there are some specific command codes that make it possible to practically declare the machining process. In the above configuration, the machining program editing assist apparatus divides the machining program into machining processes by considering such a specific command code as a machining process extracting code. This allows the operator to find the target point to edit in a short time even in the machining program conforming to the EIA/ISO standard, which is long as a machining program.

Aspect 4: The machining program editing assist apparatus according to the aspect 2, wherein the display control module is configured to make the screen further include a shape display area, characterized in that the display control module is configured to consider a defined shape, which is obtained from the shape definition data described in each row, as display candidates of the shape display area and display at least a part of the defined shapes as display objects in the shape display area, and while the display objects are being displayed in any one of the program data display area, the process list display area, and the shape display area, and when a specific point is indicated in the one of the display areas via the input device, the display control module is configured to decide that the designated display object of the one of the display areas is the display object designated by the display objects being displayed in the one of the display areas and the specific point and differentiate the designated display object from the other display objects in the one of the display areas, and the display control module is configured to decide that a designated display object of each of the other two display areas is the display candidate of each of the other display areas, which corresponds to the designated display object of the one of the display areas, include each designated display object in the display objects of each of the other two display areas, and differentiate each of the designated display objects from the other display objects in each of the other two display areas.

The above device displays the defined shape which is obtained from the shape definition data including the shape instruction code defining the tool path in each machining process, together with the program data and process name data correspondent to one another. This allows the operator to find the point to edit more quickly. For example, when the operator enters a wrong data defining the coordinate system, based on which the machining shape is defined, only the machining shape based on this coordinate system is displayed in an area far from the other machining shapes. By designating the machining shape, the relevant machining process and program data are actually designated. This allows the operator to correct the wrong data easily. Moreover, in the case of a simple error in entering the coordinate value, for example, the operator makes a mistake with the digits, only the point indicated by the coordinate value is displayed in an area irrelevant to the points indicated by the other coordinate values. In this way, the wrongly entered program data can be designated very easily.

Aspect 5: The machining program editing assist apparatus according to the aspect 4, wherein the shape instruction code includes coordinate value data, characterized in that the display control module is configured to analyze the machining program, create a coordinate value table including: the shape instruction code; the coordinate value data; and a program row number indicating the row in which each of these two data is described, and connect points indicated by the coordinate value data in the coordinate value table one by one with a connecting line to make the defined shape.

When the machining program is made using the shape instruction code defining the tool path, the tool path is calculated considering the coordinate values sometimes based on the machining cycle and the special machining cycle, etc. In the case the actual tool path is displayed as the defined shape, it takes longer time to display the defined shape by the time needed for pre-processing to calculate the tool path. In the above configuration, the defined shape is displayed by simply connecting the points indicated by instructed coordinate values, therefore the defined shape is displayed without performing the pre-processing for displaying the defined shape. Thanks to the reduced time for displaying the defined shapes, even when the operator indicates multiple data in the program data in order to find editing points in the machining program in sequence, the defined shapes correspondent to each of the indicated data are instantly displayed. This enables the operator to perform these operations without feeling stressed. In addition, even when the operator finds an error in the displayed machining shape and designates the program data correspondent to the machining shape and after he corrects the error, the corresponding machining shape is redisplayed instantly. This enables the operator to edit the program data without feeling stressed. To be exact, the displayed defined shape is a little different from the actual tool path. However, it is enough for the operator to recognize the machining shape correspondent to the machining process, and this causes no practical problems.

Aspect 6: The machining program editing assist apparatus according to the aspect 5, characterized in that a table in which a candidate for the designated display object of the shape display area is registered is a machining shape table, and while the display objects are being displayed in the shape display area, when a specific point is indicated in the shape display area via the input device, the display control module is configured to consider the connecting line of the display objects, at least a part of which passes through a given area centered at the specific point, as the candidate for the designated display object of the shape display area, register the connecting line in the machining shape table and display the candidate for the designated display object registered at the top of the machining shape table as the designated display object, and the display control module, in the case that a point located within a given distance from the specific point is indicated repeatedly, is configured to display a next candidate for the designated display object as the designated display object of the shape display area in accordance with the order registered in the machining shape table in the shape display area.

According to the above configuration, even when a number of defined shapes are mixed up in the vicinity of the specific point, the operator can obtain the information concerning the target defined shape to edit.

Aspect 7: The machining program editing assist apparatus according to the aspect 6, characterized in that in the case that the designated display object of the shape display area is designated as a result of indicating the specific point in one of the program data display area and the shape display area, and the designated display object of the shape display area is the connecting line that ends at the point indicated by the coordinate value data described in each row, the display control module is configured to differentiate the connecting line designated as the designated display object of the shape display area by displaying the connecting line such that it differs at least in one of line type, line thickness and line color from the connecting lines of the other display objects in the shape display area.

In the case the designated display object of the shape display area is designated by designating the designated display object in the program data display area or in the shape display area, the defined shape correspondent to one row of the program data is displayed being differentiated from the other defined shapes. That means, the shape and the program data can be designated in each row. This allows the operator to find the row in which the program data to edit is described referring to the shape and to designate the exact program data, immediately.

Aspect 8: The machining program editing assist apparatus according to the aspect 6, characterized in that while the display objects are being displayed in the process list display area, when a specific point is indicated in the process list display area via the input device, the display control module is configured to select one of: an only one row designating processing of designating the program data of the row in which the process name data designated as the designated display object of the process list display area is described; and an all row designating processing of designating the program data of all the rows of the machining process that the process name data belongs to, the designated display object of the program data display area is the program data of the row obtained through the only one row designating processing, and the designated display objects of the shape display area are the defined shapes based on the program data of all the rows obtained through the all row designating processing, and displayed differently in such a way that the defined shapes other than the defined shapes of the machining process designated as the designated display objects are not displayed.

The machining program defining the tool path in each row has a lot of tool paths for the machining and many different tool paths are depicted close together in a narrow area. So, it is not easy to designate the defined shape of the target machining process to edit. In the above device, the defined shapes except for the defined shapes of the designated machining process are not displayed. Therefore it is easy to find the defined shapes of the target machining process to edit.

Aspect 9: The machining program editing assist apparatus according to the aspect 1, wherein the machining method data include a tool change command code for designating a tool to perform machining, and the shape definition data include a shape instruction code for defining the tool path of the tool, and the machining program describes the machining method data and the shape definition data in each row in order of performance, and characterized in that the display control module is configured to consider the tool change command code as the process name data and consider the data from the row including the command code considered as the process name data in the machining program to the row just before the row including the command code considered as next process name data as the data of the machining process of former process name data.

The tool change command code to designate the tool to perform the machining is always included in the machining program. Simply dividing the machining program into machining processes based on the tool to perform machining and displaying the process list is almost effective to edit the programs. In the above configuration, the process list can be displayed in a simple way and this makes it easy to find the location of the point to edit in the machining program.

Aspect 10: The machining program editing assist apparatus according to the aspect 1, wherein the machining method data include a tool change command code for designating a tool to perform machining, a coordinate system designation code for designating a coordinate system, and a comment command code for putting a comment having no effects on machining in the program data, the shape definition data include a shape instruction code for defining the tool path and the machining program describes the machining method data and the shape definition data in each row in order of performance, characterized in that the display control module is configured to accept an instruction whether each of the tool change command code, the coordinate system designation code and the comment command code is considered as the separation of the machining process via the input device, consider the accepted command code as a machining process extracting code, consider the machining process extracting code as the process name data, and consider the data from the row including the command code considered as the process name data in the machining program to the row just before the row including the command code considered as next process name data as the data of the machining process of former process name data.

As stated above, the command code to designate the tool to perform the machining and the command code to designate the coordinate system based on which the machining shape is defined are always included in the machining program. In addition, there are operators who perform process control in their own way using the comment command code that allows the operator to insert his comments without having effects on the machining operations of the machining program. The configuration of the aspect 2 achieves the function to display the process list through analyzing these machining programs. However, if these command codes are not used selectively to display the list, in some machining programs, the divided machining processes are too many, uselessly. In some cases this requires further improvement when this function is used. The above configuration allows the operator to designate the command codes to use according to the machining program and makes it possible to adjust the selection of command codes so that the function of the process list can be properly used for any machining program.

Obviously, numerous modifications and variations of the present invention are possible in light of the above teachings. It is therefore to be understood that within the scope of the appended claims, the invention may be practiced otherwise than as specifically described herein.

What is claimed is:

1. A machining program editing assist apparatus for assisting in editing a machining program of a machine tool, comprising:
    a display device;
    an input device to indicate a point on a screen of the display device; and
    a display controller configured to divide the screen into display areas including a program data display area, a process list display area, and a shape display area, the display controller being configured to display data in the display areas; and
    a memory configured to store the machining program, the machining program conforming to an international standard, wherein
    the machining program has program data of a machining process separated into machining process units,
    the program data comprise:
        machining method data defining the method of machining for each machining process unit; and
        shape definition data defining the shape related to the machining of each machining process unit,
    the machining method data comprise process name data that comprises the process name of each machining process unit,
    the display controller is configured to set the program data as display candidates of the program data display area and to display at least a part of the program data as display objects in the program data display area,
    the display controller is configured to set the process name data as display candidates of the process list display area and to display at least a part of the process name data as display objects in the process list display area,
    while the display objects are displayed in at least one of the program data display area, the process list display area, or the shape display area, and when a point is indicated in the one of the display areas via the input device, the display controller is configured to
        determine that a designated display object of the one of the display areas is the display object designated by the indicated point;
        visually differentiate the designated display object from the other display objects in the one of the display areas;
        decide that a designated display object of the other of the display areas corresponds to the designated display object of the one of the display areas;
        display the designated display object in the display objects of the other of the display areas; and
        visually differentiate the designated display object from the other display objects in the other of the display areas,
    the display controller is configured to simultaneously visually differentiate the designated display object from the other display objects in the one of the display areas and visually differentiate the designated display object from the other display objects in the other of the display areas on the screen of the display device,
    a table in which candidates for the designated display object of the shape display area are registered is a machining shape table,
    while the display objects are being displayed in the shape display area, and when a specific point is indicated in the shape display area via the input device, the display controller is configured to
        consider a connecting line of the display objects, at least a part of which passes through a given area centered at the specific point, as a current candidate for the designated display object of the shape display area;
        register the connecting line in the machining shape table; and
        display the current candidate for the designated display object registered at the top of the machining shape table as the designated display object, and
    the display controller, in the case that a point located within a given distance from the specific point is indicated repeatedly via the input device, is configured to display a next candidate for the designated display object as the designated display object of the shape display area in accordance with the order registered in the machining shape table in the shape display area.

2. The machining program editing assist apparatus according to claim 1, wherein the machining method data comprise:
a tool change command code for designating a tool to perform machining;
a coordinate system designation code for designating a coordinate system; and
a comment command code for putting a comment having no effects on machining in the program data, the shape definition data comprise a shape instruction code for defining a tool path, the machining program includes the machining method data and the shape definition data in a series of rows in order of performance by the machine tool, and the display controller is configured to
consider at least one of the tool change command code, the coordinate system designation code, and the comment command code as the process name further comprised by the process name data; and
consider, as data of the machining process of former process name data, data from a first row of the series of rows including the command code considered as the process name data to a second row of the series of rows just before a third row of the series of rows including the command code considered as next process name data.

3. The machining program editing assist apparatus according to claim 2, wherein while the display objects are being displayed in any one of the program data display area, the process list display area, and the shape display area, and when a point is indicated in the one of the display areas via the input device, the display controller is configured to
consider a defined shape, which is obtained from the shape definition data described in each row, as display candidates of the shape display area;
display at least a part of the defined shapes as display objects in the shape display area;
decide that the designated display object of the one of the display areas is the display object designated by the display objects being displayed in the one of the display areas and the indicated point;
visually differentiate the designated display object from the other display objects in the one of the display areas;
decide that a designated display object of each of the other two display areas is the display candidate of each of the other display areas, which corresponds to the designated display object of the one of the display areas;
include each designated display object in the display objects of each of the other two display areas; and
visually differentiate each of the designated display objects from the other display objects in each of the other two display areas.

4. The machining program editing assist apparatus according to claim 3, wherein the shape instruction code includes coordinate value data, and the display controller is configured to
analyze the machining program;
create a coordinate value table comprising:
the shape instruction code;
the coordinate value data; and
a program row number indicating the row in which each of these two data is provided; and
connect points indicated by the coordinate value data in the coordinate value table one by one with a connecting line to create the defined shape.

5. The machining program editing assist apparatus according to claim 4, wherein in the case that the designated display object of the shape display area is designated by the indicated point in one of the program data display area and the shape display area, the designated display object of the shape display area is the connecting line that ends at the point indicated by the coordinate value data, and the display controller is configured to differentiate the connecting line designated as the designated display object of the shape display area by displaying the connecting line such that it differs at least in one of line type, line thickness, and line color from the connecting lines of the other display objects in the shape display area.

6. The machining program editing assist apparatus according to claim 4, wherein while the display objects are being displayed in the process list display area, and when a specific point is indicated in the process list display area via the input device, the display controller is configured to select one of an only one row designating processing of designating the program data of the row in which the process name data designated as the designated display object of the process list display area is described and an all row designating processing of designating the program data of all the rows of the machining process that the process name data belongs to, the designated display object of the program data display area is the program data of the row obtained through the only one row designating processing, and the designated display objects of the shape display area are the defined shapes based on the program data of all the rows obtained through the all row designating processing, and displayed differently in such a way that the defined shapes other than the defined shapes of the machining process designated as the designated display objects are not displayed.

7. The machining program editing assist apparatus according to claim 1, wherein the machining program includes command codes according to the international standard, the international standard being an Electronic Industries Alliance or International Organization for Standardization (EIA/ISO) standard, the machining program includes the command codes in a series of rows in order of performance, the display controller is configured to
accept, via the input device, an instruction that at least one specified command code should be handled as one of the machining process units;
consider the accepted specified command code as a machining process extracting code; and
consider the machining process extracting code as the process name further comprised by the process name data; and
consider, as data of the machining process of former process name data, data from a first row of the series of rows including the command code considered as the process name data to a second row of the series of rows just before a third row of the series of rows including the command code considered as next process name data.

8. The machining program editing assist apparatus according to claim 1, wherein
the machining method data comprise a tool change command code for designating a tool to perform machining,
the shape definition data comprise a shape instruction code for defining a tool path of the tool,
the machining program includes the machining method data and the shape definition data in each row of a series of rows in order of performance by the machine tool, and
the display controller is configured to
consider the tool change command code as the process name further comprised by the process name data; and
consider, as data of the machining process of former process name data, data from a first row of the series of rows including the tool change command code considered as the process name data to a second row of the series of rows just before a third row of the series of rows including the tool change command code considered as next process name data.

9. The machining program editing assist apparatus according to claim 1, wherein
the machining method data comprise:
a tool change command code for designating a tool to perform machining;
a coordinate system designation code for designating a coordinate system; and
a comment command code for putting a comment having no effects on machining in the program data,
the shape definition data comprise a shape instruction code for defining the tool path,
the machining program describes the machining method data and the shape definition data in each row of a series of rows in order of performance by the machine tool, and
the display controller is configured to
accept an instruction whether each of the tool change command code, the coordinate system designation code, and the comment command code is considered as the separation of the machining process via the input device;
consider the accepted command code as a machining process extracting code;
consider the machining process extracting code as the process name further comprised by the process name data; and
consider, as data of the machining process of former process name data, data from a first row of the series of rows including the command code considered as the process name data to a second row of the series of rows just before a third row of the series of rows including the command code considered as next process name data.

10. The machining program editing assist apparatus according to claim 1, wherein
while the display objects are being displayed in any one of the program data display area, the process list display area, and the shape display area, and when a point is indicated in the shape display area via the input device, the display controller is configured to
visually differentiate the designated display object from the other display objects in the program data display area or the process list display area based on the point indicated in the shape display area.

11. The machining program editing assist apparatus according to claim 1, wherein
the display controller is configured to simultaneously visually differentiate the designated display object from the other display objects in each of the display areas, the designated display object being visually differentiated in the shape display area by showing only machining shapes of the machining process of the designated display object.

* * * * *